United States Patent
Byers et al.

(10) Patent No.: US 10,023,326 B2
(45) Date of Patent: Jul. 17, 2018

(54) PRE-FLIGHT SELF TEST FOR UNMANNED AERIAL VEHICLES (UAVS)

(71) Applicant: Cisco Technology, Inc., San Jose, CA (US)

(72) Inventors: Charles Calvin Byers, Wheaton, IL (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/364,852

(22) Filed: Nov. 30, 2016

(65) Prior Publication Data

US 2017/0081045 A1     Mar. 23, 2017

Related U.S. Application Data

(63) Continuation of application No. 14/631,137, filed on Feb. 25, 2015, now Pat. No. 9,540,121.

(51) Int. Cl.

| | |
|---|---|
| *G06G 7/70* | (2006.01) |
| *B64F 5/60* | (2017.01) |
| *B64C 39/02* | (2006.01) |
| *B64F 1/12* | (2006.01) |
| *B64F 1/04* | (2006.01) |
| *B64F 1/00* | (2006.01) |
| *A47G 29/14* | (2006.01) |

(52) U.S. Cl.
CPC ............... *B64F 5/60* (2017.01); *A47G 29/14* (2013.01); *B64C 39/024* (2013.01); *B64F 1/00* (2013.01); *B64F 1/04* (2013.01); *B64F 1/12* (2013.01); *B64C 2201/00* (2013.01); *B64C 2201/027* (2013.01); *B64C 2201/042* (2013.01); *B64C 2201/066* (2013.01); *B64C 2201/08* (2013.01); *B64C 2201/108* (2013.01); *B64C 2201/128* (2013.01); *B64C 2201/141* (2013.01)

(58) Field of Classification Search
USPC .......................................................... 701/15
See application file for complete search history.

(56) References Cited

U.S. PATENT DOCUMENTS

| | | |
|---|---|---|
| 6,868,314 B1 | 3/2005 | Frink |
| 8,511,606 B1 | 8/2013 | Lutke et al. |
| | (Continued) | |

OTHER PUBLICATIONS

Amazon Prime Air, http://www.amazon.com/b?node=8037720011; pp. 1-3.

(Continued)

*Primary Examiner* — Tyler Paige
(74) *Attorney, Agent, or Firm* — Parker Ibrahim & Berg LLP; James M. Behmke; Stephen D. LeBarron

(57) ABSTRACT

In one embodiment, a controller instructs an unmanned aerial vehicle (UAV) docked to a landing perch to perform a pre-flight test operation of a pre-flight test routine. The controller receives sensor data associated with the pre-flight test operation from one or more force sensors of the landing perch, in response to the UAV performing the pre-flight test operation. The controller determines whether the sensor data associated with the pre-flight test operation is within an acceptable range. The controller causes the UAV to launch from the landing perch based in part on a determination that UAV has passed the pre-flight test routine.

18 Claims, 10 Drawing Sheets

(56) References Cited

U.S. PATENT DOCUMENTS

| | | | |
|---|---|---|---|
| 8,626,361 | B2 | 1/2014 | Gerlock |
| 8,909,391 | B1 | 12/2014 | Peeters et al. |
| 9,139,310 | B1 * | 9/2015 | Wang .................. B64F 1/36 |
| 9,244,147 | B1 | 1/2016 | Soundararajan et al. |
| 2005/0223288 | A1 | 10/2005 | Berbaum et al. |
| 2008/0234930 | A1 | 9/2008 | Cheok et al. |
| 2009/0005916 | A1 | 1/2009 | Wainwright et al. |
| 2011/0035149 | A1 | 2/2011 | McAndrew et al. |
| 2011/0084162 | A1 | 4/2011 | Goossen et al. |
| 2012/0143482 | A1 | 6/2012 | Goossen et al. |
| 2012/0316913 | A1 | 12/2012 | Reyes |
| 2013/0081245 | A1 | 4/2013 | Vavrina et al. |
| 2014/0032034 | A1 | 1/2014 | Raptopoulos et al. |
| 2014/0254896 | A1 | 9/2014 | Zhou et al. |
| 2014/0279809 | A1 | 9/2014 | Hershey et al. |
| 2014/0332620 | A1 | 11/2014 | Earon |
| 2015/0158587 | A1 | 6/2015 | Patrick et al. |
| 2015/0266575 | A1 | 9/2015 | Borko |
| 2015/0370251 | A1 | 12/2015 | Siegel et al. |
| 2016/0033966 | A1 | 2/2016 | Farris et al. |
| 2016/0039300 | A1 * | 2/2016 | Wang .................. B60L 11/1822 244/39 |
| 2016/0039541 | A1 * | 2/2016 | Beardsley ........... B60L 11/1816 701/2 |
| 2016/0068265 | A1 | 3/2016 | Hoareau et al. |

OTHER PUBLICATIONS http://payload177.cargocollective.com/1/4/143604/5846127/23_1000.jpg: p. 1.

http://payload177.cargocollective.com/1/4/143604/5846127/15-01_1000.jpg; p. 1.

Idobaruchin/Design; http://www.idobaruchin.com/#Matternet-1; pp. 1-9.

AR.Drone Landing Pad Detection Recalibration test—Youtube; https://www.youtube.com/watch?v=u7SG5fhR2Dg; pp. 1-2.

Flight Assembled Architecture; https://www.youtube.com/watch?v=JnkMyfQ5YfY; pp. 1-2.

Brian Fung: The Washington Post, The Switch—"Everything you need to know about Amazon's new delivery drones", Dec. 2, 2013, pp. 1-6.

IEEE Xplore Abstract; UAVNet: A mobile wireless mesh network using Unmanned Aerial Vehicles, pp. 1-2.

Anurag Kumar; GizmoBolt; [Review] Sony Magnetic Charging Dock DK31 for Xperia Z1; Oct. 14, 2013; pp. 1-7.

Roomba; "A Robotic Vacuum that Actually Works", Introduction to 2nd Generation Roomba; Jan. 7, 2006; pp. 1-37.

Physics of the Electromagnetic Ring Launcher, Wired; http://www.wired.com/2014/01/physics-of-the-electromagnetic-ring-launcher; pp. 1-18.

"Physics of the Amazon Octocopter Drone", Wired; http://wired.com/2013/12/physics-of-the-amazon-prime-air-drones; pp. 1-15.

MagSafe; http://en.wikipedia.org/wiki/MagSafe; pp. 1-6.

Toksoz et al., "Automated Battery Swap and Recharge to Enable Persistant UAV Missions", American Institute of Aeronautics and Astronautics, pp. 1-10.

Inductive Charging; http://en.wikipedia.org/wiki/Inductive_Charging; pp. 1-7.

Kong et al. "Autonomous landing of an UAV with a ground-based actuated infrared stereo vision system", Intelligent Robots and Systems (IROS); 2013 IEEE/RSJ; pp. 1-2.

"BU-410: Charging at High and Low Temperatures"; Battery University, Powering Advanced Battery Testing; pp. 1-5.

"Garden Gnome Drone", Elec 499 Project, Spring 2013; http://www.gardengnomedrone.com/products; pp. 1-2.

Tessel Renzenbrink, "DroneNet: Decentralized Delivery System of Flying Robots"; Tech the future, Jan. 9, 2013; pp. 1-5.

Jeffrey Bausch, "Flying robots deliver goods to peverty-stricken parts of the world", Electronic Products; Mar. 12, 2012; pp. 1-5.

"DRONENET, The Next Big Thing"; Global Guerilas; Jan. 2, 2013; pp. 1-3.

David Gianatasio, "What Every House Needs: A Century 21 Branded Landing Pad for Amazon Drones Outift your Home Today"; Adweek; Dec. 6, 2013; pp. 1-4.

Doowon Kim, "A Survey of Balloon Networking Applications and Technologies"; CSE570S; Dec. 10, 2013; pp. 1-13.

Ars Technica—OpenForum; drone deliveries; Dec. 4, 2013; pp. 1-20.

* cited by examiner

PRE-FLIGHT SELF TEST FOR UNMANNED AERIAL VEHICLES (UAVS)

RELATED APPLICATION

The present application is a Continuation Application of U.S. patent application Ser. No. 14/631,137, filed Feb. 25, 2015, entitled PRE-FLIGHT SELF TEST FOR UNMANNED AERIAL VEHICLES (UAVs), by Charles Calvin Byers et al., the contents of which is hereby incorporated by reference.

TECHNICAL FIELD

The present disclosure relates generally to unmanned aerial vehicles (UAVs) and, more particularly, to pre-flight test mechanisms for UAVs.

BACKGROUND

With the rapid rise in e-commerce sales, more and more goods are being delivered to residential and business addresses. As a result, parcel delivery services are now experiencing record delivery volumes. This increased volume has also led to corresponding increases in road traffic, energy use, and labor expenses, in an effort to continue meeting society's demand for delivered goods.

In general, attempts to streamline the parcel delivery process have focused on central distribution facilities. In particular, many parcel delivery services now utilize large delivery hubs that coordinate deliveries from centralized locations. Within a given hub, packages may be sorted and routed for delivery. However, deliveries from the hub to the addressees still require a fleet of delivery vehicles. For example, a package may be loaded onto a delivery truck at a local hub and driven by a delivery driver to the final destination. Once there, the delivery driver may manually carry the package along the final leg of the delivery route from the delivery truck to the drop off location (e.g., the front steps of a house, the foyer of an apartment complex, etc.).

Unmanned aerial vehicles (UAVs) present a potential way to partially or fully automate the parcel delivery process. For example, a UAV may carry a package to a drop off location instead of a delivery driver carrying the package. While UAV-based parcel delivery appears promising, a number of logistical, technical, and regulatory challenges remain before this becomes a reality.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
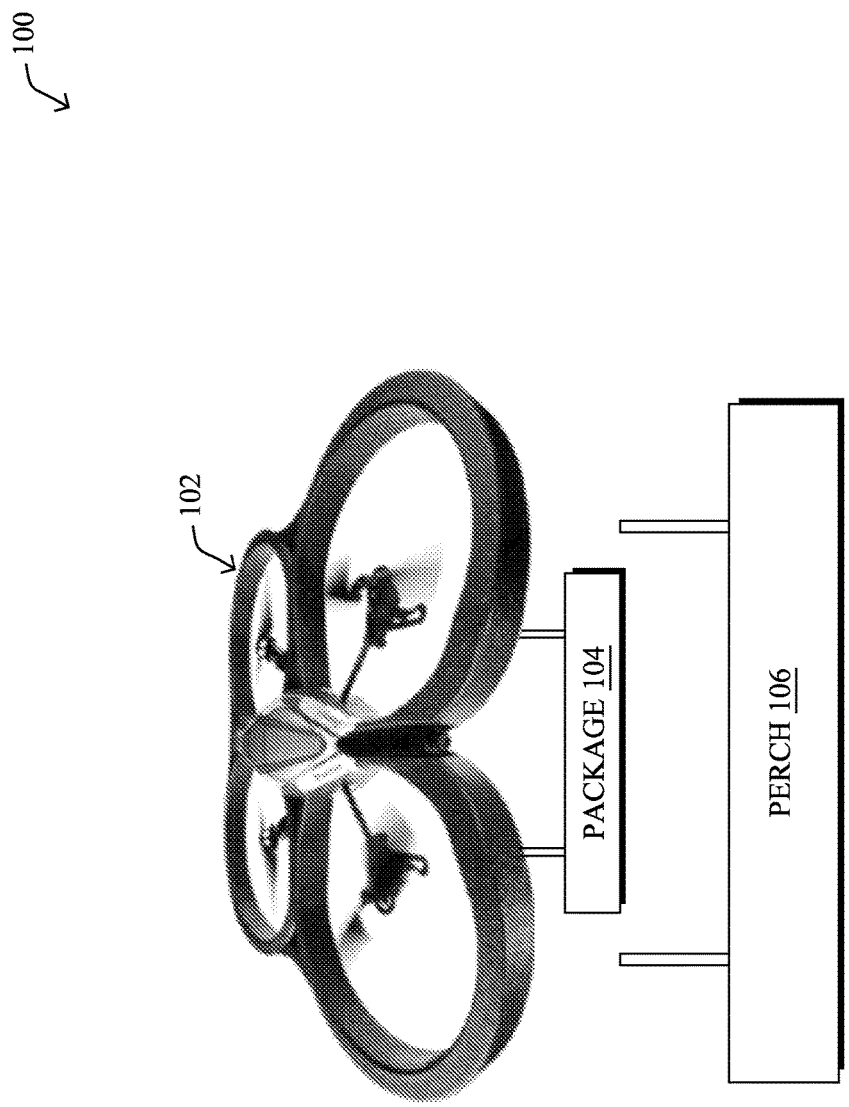
FIG. 1 illustrates an example package delivery system.

According to one or more embodiments of the disclosure, a controller instructs an unmanned aerial vehicle (UAV) docked to a landing perch to perform a pre-flight test operation of a pre-flight test routine. The controller receives sensor data associated with the pre-flight test operation from one or more force sensors of the landing perch, in response to the UAV performing the pre-flight test operation. The controller determines whether the sensor data associated with the pre-flight test operation is within an acceptable range. The controller causes the UAV to launch from the landing perch based in part on a determination that UAV has passed the pre-flight test routine.

In further embodiments, a landing perch for an unmanned aerial vehicle (UAV) is disclosed. The landing perch includes a base having a plurality of posts that extend from the base and are configured to couple with apertures of the UAV. The landing perch also includes one or more force sensors located on one or more of the plurality of posts. The landing perch further has a controller that includes one or more network interfaces to communicate with a computer network, a processor coupled to the one or more network interfaces and configured to execute a process, and a memory configured to store the process executable by the processor. When executed, the process is operable to instruct the UAV to perform a pre-flight test operation of a pre-flight test routine prior to being launched from the landing perch. The process when executed is further operable to receive sensor data associated with the pre-flight test operation from the one or more force sensors, in response to the UAV performing the pre-flight test operation. The process when executed is additionally operable to determine whether the sensor data associated with the pre-flight test operation is within an acceptable range. The process when executed is also operable to cause the UAV to launch from the landing perch based in part on a determination that UAV has passed the pre-flight test routine.

In yet other embodiments, an unmanned aerial vehicle (UAV) is disclosed. The UAV includes a frame defining one or more apertures configured to couple with one or more posts of a landing perch. The UAV also has a controller that includes one or more interfaces to communicate with the landing perch, a processor coupled to the one or more interfaces and configured to execute a process, and a memory configured to store the process executable by the processor. When executed, the process is operable to receive an instruction from the landing perch to perform a pre-flight test operation. The process when executed is also operable to perform the pre-flight test operation while the UAV is docked at the landing perch. The process when executed is further operable to receive launch authorization from the landing perch and to launch the UAV from the landing perch.

Description

The techniques herein generally provide a system in which unmanned aerial vehicles (UAVs) may be used to transport packages and/or large amounts of data between different entities. In some aspects, a UAV landing perch is disclosed. The perch may be operable to assist a UAV during takeoffs or during landings, provide charge to the UAV, enable communications with the UAV, and/or provide storage to the UAV when the UAV is not in use. A pre-flight self test procedure is also introduced herein that may work in conjunction with the landing perch, to facilitate launch of a UAV. Such a procedure may include, in some aspects, receiving flight approval from an air traffic control (ATC) authority.

Referring now to FIG. 1, an example package delivery system 100 is shown, according to various embodiments. Package delivery system 100 may generally include a UAV 102, a package 104, and a landing perch 106 configured to couple with UAV 102. UAV 102 may be any form of aerial vehicle, according to various embodiments. For example, UAV 102 may be a single or multi-rotor helicopter (e.g., a quadcopter, a hexacopter, an octocopter, etc.), an unmanned airplane, or other form of unmanned aerial vehicle.

As shown, UAV 102 may be configured to retain a package 104 while in flight. In some embodiments, UAV 102 may include internal retaining mechanisms such as electromagnets, clips, hooks, or other fasteners, to retain package 104 during flight. In further embodiments, UAV 102 may include robotic equipment configured to grip and/or position (e.g., raise or lower) package 104. For example, UAV 102 may include movable claws, grips, and/or struts that are operated via magnets, robotic motors, cables, pneumatics, etc., to retain and release package 104.

Package delivery system 100 may also include a landing perch 106 configured to couple with UAV 102 when UAV 102 is not in flight. In some cases, landing perch 106 may act as a gateway between UAV 102 and package 104, thereby allowing package 104 to be loaded onto UAV 102 while UAV 102 is docked with landing perch 106. In other cases, landing perch 106 may simply act as a storage location for UAV 102 until package 104 is ready to be delivered. In such a case, after takeoff, UAV 102 may fly to a pickup location for package 104 and grasp package 104 for delivery.

Figure 2A:
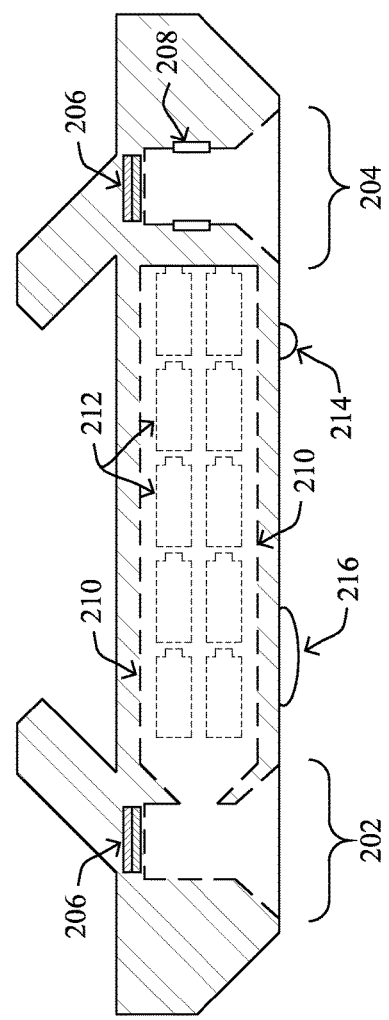
FIG. 2A illustrates an example cross-sectional view of an unmanned aerial vehicle (UAV)
Figure 2A:
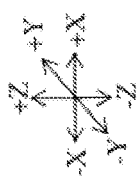
Figure 2B:
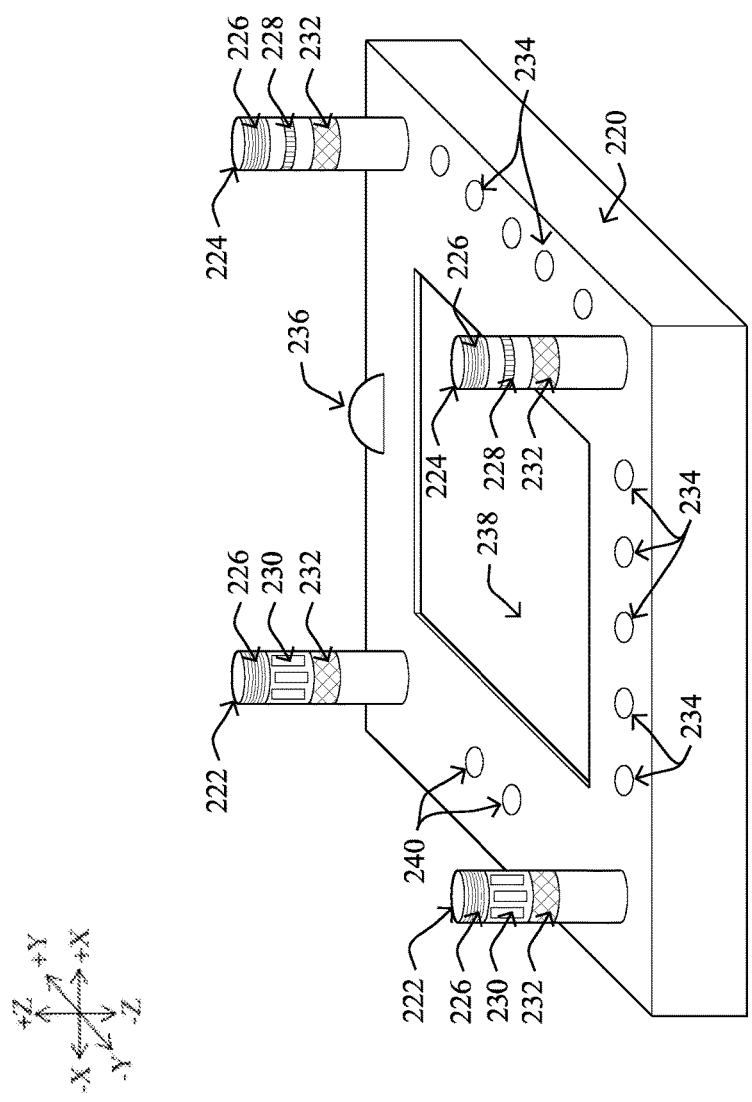
FIG. 2B illustrates an example landing perch for a UAV.

FIGS. 2A-2B illustrate UAV 102 and landing perch 106 in greater detail, respectively, according to various embodiments. As shown, UAV 102 may include one or more apertures 202-204 (e.g., the body of UAV 102 may define apertures 202-204) configured to couple with posts 222-224 of landing perch 106 when docked, according to various embodiments. As would be appreciated, landing perch 106 may be located anywhere along a package delivery route. For example, landing perch 106 may be located at a distribution center or at an endpoint delivery location (e.g., on top of a building, outside of a window, on top of a postal box, etc.). In other cases, landing perch 106 may be located at an intermediary point along a delivery route (e.g., to provide additional charging to UAV 102, etc.). In further embodiments, as described in greater detail below, landing perch 106 may be part of a delivery roost, such as on board a mobile delivery vehicle or at a centralized delivery hub that coordinates multiple delivery UAVs.

Landing perch 106 may be operable to assist UAV 102 as it lands, retain UAV 102 during its ground operations (e.g., delivery of a package, charging, etc.), and/or assist UAV 102 during takeoff. In some embodiments, landing perch 106 may provide energy to UAV 102 to provide a rapid charge of its batteries, coolant to ensure the components of UAV 102 stay within a given temperature range, execute testing routines on UAV 102, and/or incorporate various other features such as beacons, data link, security cameras, etc.

Landing perch 106 may be sized appropriately to accommodate UAV 102. For example, in one embodiment, UAV 102 may have the following specifications:
Size: approximately 32"×32"×16"
Payload: 5 lb.
Maximum loaded weight: 15 lbs.
Flight time: 30 minutes per charge
Maximum speed: 40 MPH
Operating power: 548 Watts (hovering)
Battery capacity: ~220 Watt-hours (e.g., approximately $10^6$ Joules)

In other embodiments, landing perch 106 may be sized and shaped to accommodate UAVs having other specifications.

As shown in FIG. 2B, landing perch 106 may include a base 220 and one or more posts 222, 224 that extend from base 220 and are describe in greater detail below. For example, landing perch 106 may have a total of four posts 222-224 that are configured to couple with corresponding apertures 202-204 located on the bottom of UAV 102. During landing, the conical features of apertures 202-204 may help to align and couple posts 222-224 within apertures 202-204 during landing. Once UAV 102 has landed and docked with landing perch 106, landing perch 106 may retain UAV 102 in position until UAV 102 is assigned its next delivery task.

In some embodiments, base 220 may be a substantially hollow enclosure that provides mechanical rigidity and houses the internal ground support components of landing perch 106. Base 220 may also define aperture 238 through which UAV 102 may deposit a package into smart postal box 102 (e.g., with the aid of robotic equipment working from below) or receive a package for delivery. Base 220 may also include a set of one or more beacon lights 234 that UAV 102 may use to adjust its alignment and orientation during a landing. As shown, beacon lights 234 may form an "L" shaped array comprising ten high power light emitting diodes (LEDs) or other emitters on base 220. However, in alternative embodiments, beacon lights 234 may be located on posts 222-224 or arranged in other configurations, according to other embodiments. Landing perch 106 may control the intensities of beacon lights 234 and modulate them with a data link which UAV 102 may scan at a distance, to assist UAV 102 in identifying the specific perch on which it is to land. A down-pointing camera 216 on UAV 102 may be used to detect the position and orientation of beacon lights 234 and performs approach guidance, to ensure that UAV 102 comes down on all four posts 222-224 within the gather radii of its conical apertures 202-204.

In some embodiments, one or more lenses 240 (e.g., optical transmitters/receivers) may be located on top of base 220 or perches 222-224, to provide an optical communication link between landing perch 106 and UAV 102. Once UAV 102 is docked, lenses(s) 240 may provide a direct free space optical beam to corresponding lens(es) 214 on the bottom of UAV 102, as shown in FIG. 2A. In doing so, this may form a high bandwidth optical link (e.g., potentially with a bandwidth of 1-10 Gb/s or higher in each direction) that UAV 102 can use to download logs, upload orders, update terrain maps, transfer self test data, etc., while docked to landing perch 106. In further embodiments, other communication links may be used (e.g., WiFi, Bluetooth, a serial connection, etc.) to relay data between UAV 102 and landing perch 106. However, an optical link may provide certain advantages such as high bandwidth, freedom from interference, security, independence of RF spectrum availability, power and cost, etc.

In another embodiment, base 220 may include a security camera 236. Using a fisheye lens, for example, security camera 236 may survey the sky and surrounding ground horizons, to ensure no obstructions or other UAVs are in the area prior to takeoff of UAV 102. In some cases, security camera 236 may also be operable to record a malicious user that attempts to steal or vandalize UAV 102, package 104, landing perch 106, or any other device associated with package delivery system 100.

Landing perch 106 may have processing capabilities as part of a larger system (e.g., via an external controller) and/or via an internal controller. In various embodiments, such a controller may interface with the various sensors, actuators, and networking capabilities of landing perch 106. The controller may also provide control over various ground support functions such as a magnetic UAV retention system, UAV temperature regulation systems, UAV charging systems, etc. Further, the controller may provide networking capabilities, including operating Internet connections (e.g., between perch 106 and the Internet and/or between a controller of UAV 102 and the Internet), the high speed data links to a docked UAV, lower speed data links that are modulated on beacon lights 234, or any other functions of landing perch 106. In some embodiments, the controller of landing perch 106 may also perform various diagnostic and test functions described above, coordinate test programs with the on-board processor of UAV 102, interface with the load cells of UAV 102, etc.

Many of these operations performed by landing perch 106 have hard real-time requirements and risk instability if their operational latency is too long. In addition, some operations may also require enough local processing power to run autonomously, even if a connection between landing perch 106 and the Internet is unavailable. Some of the processor's functions may require significant local storage (e.g., for regional terrain maps, operational logs, etc.). The output of security camera 236 may also be analyzed by local video analytics processing to detect operational hazards and take appropriate actions. In some embodiments, landing perch 106 may have some security/cryptographic capabilities (e.g., to prevent against malicious hackers) and provide data protection at the local node. Fog computing techniques can be used in the local landing perch 106, to ensure that it has the necessary latency, storage, security and robustness properties without relying solely on cloud-based resources (e.g., by performing localized storage and processing, conveying data to and from a delivery vehicle, etc.).

In various embodiments, the controller of landing perch 106 may collaborate with any number of cloud-based resources reachable over a private or public network (e.g., hosted on a remote server). For example, such services may coordinate fleet operations, relay position or navigation data, provide air traffic control services, provide maintenance activities, or the like. Such services may be based on HTML5 and may use WebRTC, for example, to ensure low latency between the local controller of landing perch 106 and the cloud-based resources. In one embodiment, the automated discovery of parameters may use the Webfinger protocol detailed in the Internet Engineering Task Force (IETF) Request for Comments (RFC): 7033 by P. Jones, et al., or a similar protocol, for information discovery.

Optionally, base 220 may also form an aperture 238 that extends through landing perch 106. Aperture 238 may be sized such that package 104 may be coupled to UAV 102 when UAV 102 is docked onto landing perch 106. For example, robotic equipment located on UAV 102 or below landing perch 106 may retrieve package 104 and couple package 104 to UAV 102 for delivery. In some cases, landing perch 106 or the object below landing perch 106 (e.g., a postal box, etc.) may include one or more mechanisms to cover aperture 238 when not in use such as roll doors or the like.

In some embodiments, posts 222 and/or 224 may be configured to retain UAV 102 while docked. For example, as shown, posts 222-224 may include electromagnetic coils 226 that can be energized by landing perch 106 and interact with corresponding magnets 206 located in apertures 202-204 of UAV 102. For example, if magnets 206 have their south poles pointing downward, and the polarity of the current flowing in coils 226 causes the top surfaces of posts 222-224 to be magnetic north poles, a strong attractive force may be generated between landing perch 106 and UAV 102. Conversely, if the current polarities in coils 226 are reversed, a repulsive force between landing perch 106 and UAV 102 may result. This may be performed to provide additional boost to UAV 102 during takeoff and may even allow greater payloads to be carried. In some embodiments, position and/or rate of decent sensors may monitor UAV 102 and landing perch 106 may adjust the current through coils 226, accordingly, to ensure a soft landing. Increasing the amount of current through coils 226 during takeoff of UAV 102 may also allow UAV 102 to rapidly increase its altitude and out of the range of people, animals, vehicles, etc. Such a launch current may be adjusted based on position sensors in posts 222-224, accelerometers in UAV 102, etc., to ensure that the takeoff forces are within the design limits of UAV 102 and its payload.

In some embodiments, posts 222-224 may include force sensors 232 that are operable to measure the three dimensional forces exerted on posts 222-224. In some cases, landing perch 106 may use sensors 232 to determine whether UAV 102 is correctly docked with all posts and completely seated after landing. In further cases, landing perch 106 may use sensors 232 to measure the wind load on a parked UAV, to determine whether it is safe to operate. In yet another example, sensors 232 may provide security functions, such as detecting an attempt to forcibly rip UAV 102 from landing perch 106. In another cases, sensors 232 may be used to measure the total takeoff weight of UAV 102 and its payload, to ensure the weight conforms to an acceptable weight range (e.g., due to regulatory limits, operational limits, etc.). In an additional example, sensors 232 may measure the upward and lateral forces on UAV 102 during a takeoff operation to verify that the rotors and flight controls of UAV 102 are functioning normally. In yet a further case, sensors 232 may be used to test various maneuvers that may be performed by UAV 102 (e.g., rise, hover, descent, turn, bank, etc.), to ensure the correct forces act on the frame of UAV 102, as part of a pre-flight test routine. Once UAV 102 has completed such a test routine, and the load cell readings are verified as within limits, the post magnets formed by coils 226 may be reversed, and UAV 102 can be launched with confidence that all systems are operating correctly.

As shown in FIG. 2A, UAV 102 may house one or more rechargeable batteries 212 that provide power to the systems of UAV 102. In some cases, UAV 102 may also include internal ducts 210 that may be used to provide cooling or heating to the internals of UAV 102 (e.g., as a temperature controlled gas or liquid). According to various embodiments, the posts of landing perch 106 may be configured to recharge batteries 212 and/or provide cooling through cooling ducts 210 when UAV 102 is docked to landing perch 106. In other embodiments, a heating medium may be passed through ducts 210, to heat UAV 102 (e.g., during icy weather).

In some embodiments, the posts 222-224 of landing perch 106 may operate in pairs. For example, posts 222 may include electrical contacts 228 that electrically couple with contacts 208 located in corresponding aperture(s) 204 of UAV 102 and transfer electrical power to batteries 212. Depending on the chemistry of batteries 212, and the speed of charge desired, rather large charging energy may be required (e.g., potentially up to 2 kW for larger classes of UAVs), to achieve a very quick charge. This could be on the order of 40 Amps at 48 VDC through these contacts, for example.

In contrast to charging posts 224, posts 222 may be configured to provide cooling or heating to UAV 102. For example, cooling posts 222 may include apertures 230 that couple with ducts 210 when UAV 102 is docked and supply coolant or a heated medium to UAV 102 through ducts 210. In one embodiment, ducts 210 may circulate a supplied coolant around batteries 212 to remove waste heat attributable to the charging process, thereby preventing batteries 212 from overheating. Example coolants may include, but are not limited to, cold pressurized gas or air that is passed through ducts 210 and exhausted into the atmosphere and liquid coolants that may be conveyed between two or more of posts 222 via ducts 210. To assist operations in very cold environments, the cooling system may alternatively be configured to supply a warmed gas or liquid, to ensure that the temperatures of batteries 212 do not fall below a certain limit (e.g., for operation in winter conditions). Ducts 210 may also be extended in other embodiments, to supply heating or cooling to other components of UAV 102 (e.g., motors, electrical components, etc.).

As would be appreciated, the configuration of posts 222-224 on landing perch 106 is exemplary only and that other configuration may be used, in other embodiments. For example, landing perch 106 may include any number of posts (e.g., one post, two posts, etc.), in various embodiments. Additionally, any given posts may include any number of the features shown. For example, a particular post of landing perch 106 may include any of the beacon lights 234, lens 240, retaining coils 226, electrical contacts 228, apertures 230, sensors 232, and/or camera 236, in some embodiments.

Figure 3A:
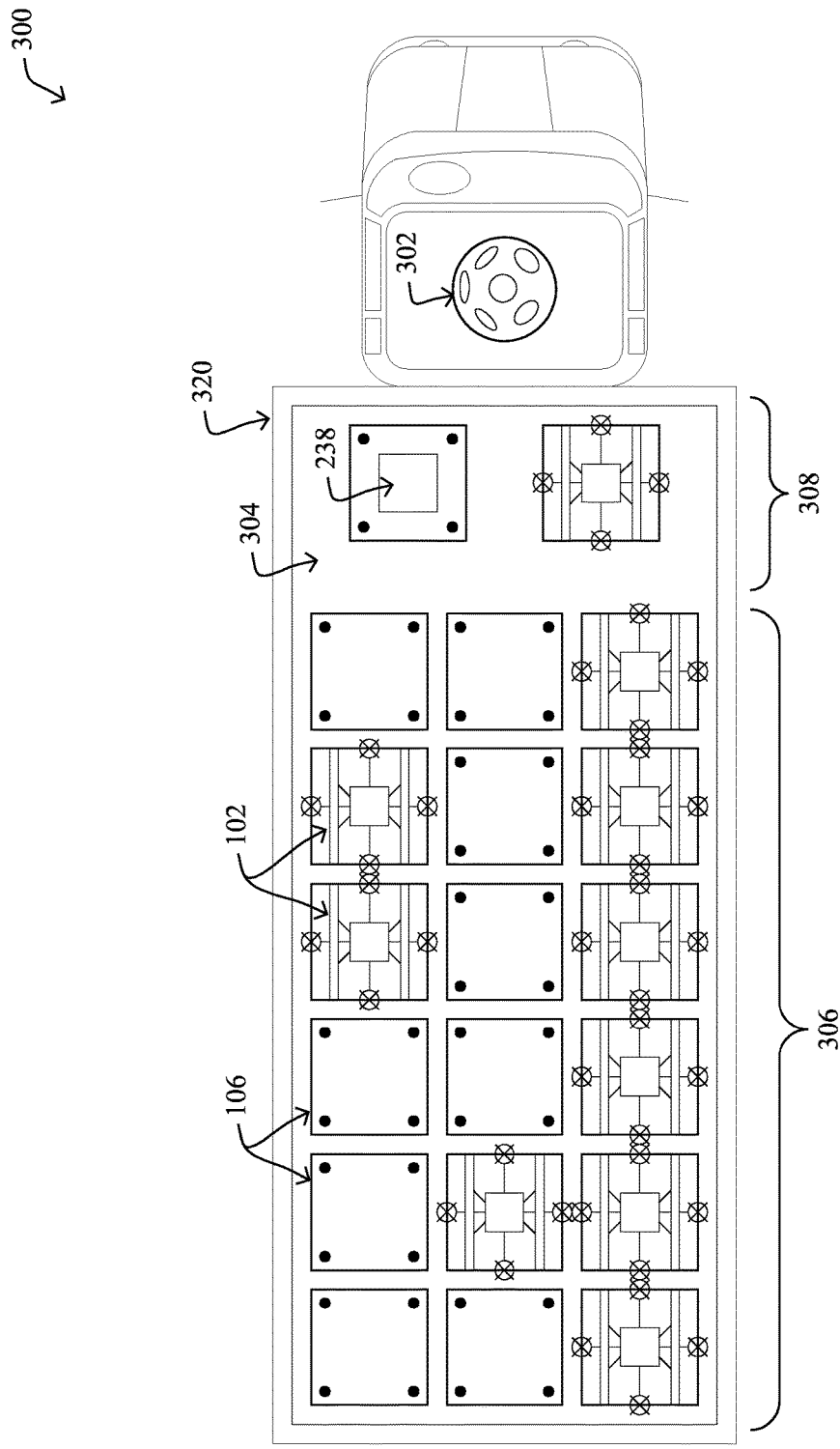
FIGS. 3A-3B illustrate an example storage roost for a flock of UAVs.
Figure 3B:
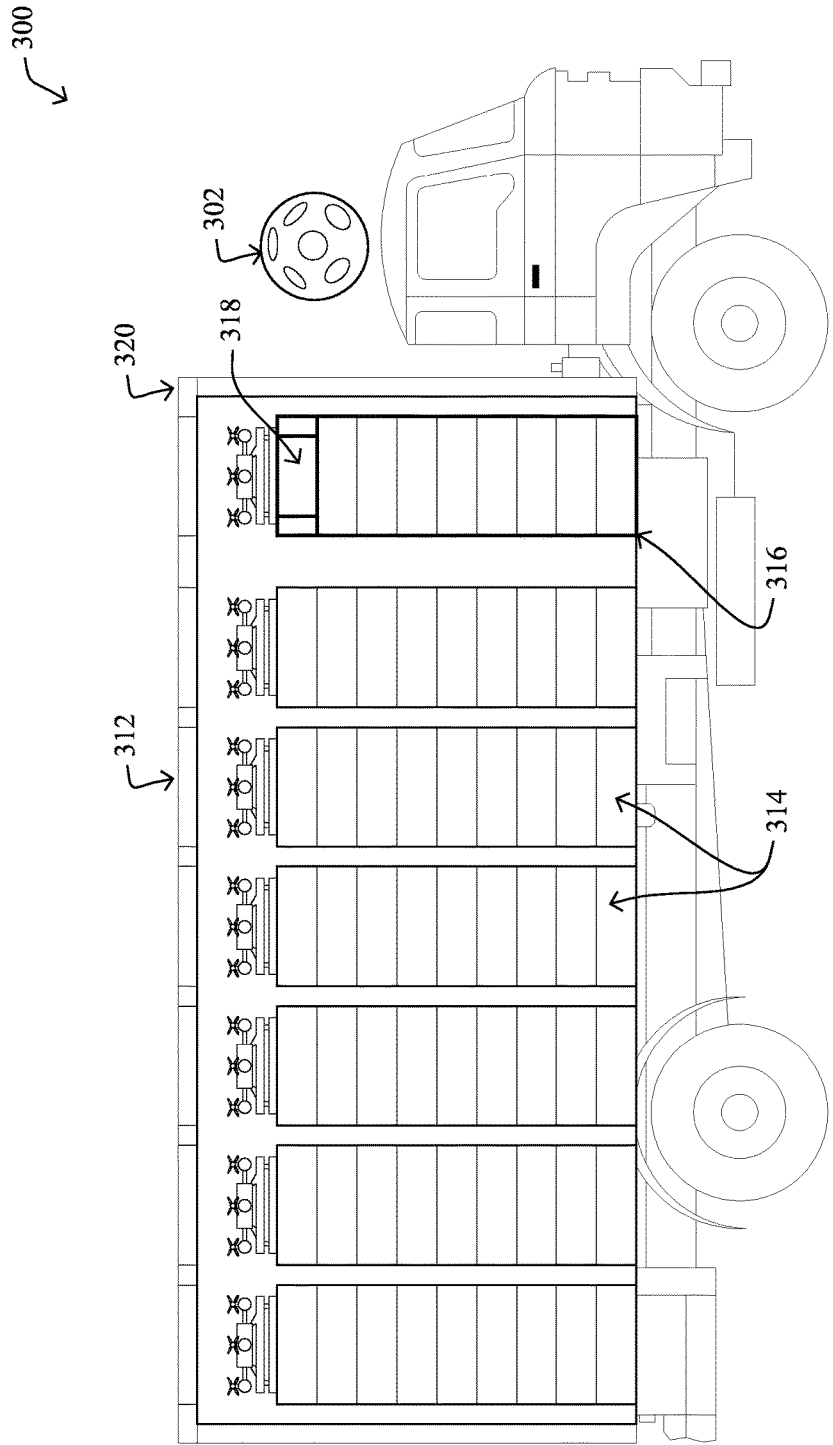

Referring now to FIGS. 3A-3B, an example landing roost 300 for a flock of delivery UAVs 102 is shown, according to various embodiments. As used herein, a "roost" generally refers to a location in which multiple delivery UAVs 102 may be housed. In general, roost 300 may perform various functions regarding a flock of UAVs 102 such as, but not limited to, managing the power, cooling, programming, package loading, security, safety, and protection of the flock. Server computers communicatively coupled to landing roost 300 may coordinate the UAVs 102, to ensure the delivery service operates as safely and efficiently as possible. As shown, a road vehicle 320 (e.g., a delivery truck) may host landing roost 300, according to one embodiment. However, in other embodiments, landing roost 300 may be located in a distribution warehouse, at a local merchant, on a seagoing vessel, or in any other location.

In various embodiments, road vehicle 320 may host a plurality of landing perches 106 as part of a two or three dimensional array, thereby forming roost 300. Typically such a truck may be approximately thirty feet in length and may be modified to host a flock of UAVs 102 and associated package handling automation. For example, the roost compartment may occupy approximately the top two feet of the cargo space of the truck, with each of landing perches 106 being approximately thirty two inches on center. Such a compartment may be defined by a solid, weatherproof floor 304 and a retractable roof 312 that protects UAVs 102 and landing perches 106 from the elements when road vehicle 320 is in motion or experiencing certain weather conditions. As shown, any number of landing perches 106 and UAVs 102 may be housed within road vehicle 320 as part of roost 300.

In some embodiments, landing perches 106 may be divided into two different groups 306 and 308 based on their configurations. In one embodiment, group 306 may include perches configured to store and charge idle UAVs 102. For example, in a typical delivery truck, group 306 may include eighteen storage perches 106 in a 3×6 array, as shown in FIG. 6A. Group 308, however, may include a 1×2 array of specialized loading perches 106 that localized robotics (e.g., equipment 318) may use to load and unload cargo from below the docked UAV (e.g., via aperture 238). With such groupings, a typical truck may protect and transport up to twenty delivery UAVs 102. In particular, in the example shown, up to twenty UAVs 102 can be protected, transported, and supported by road vehicle 320 with eighteen on the storage perches 106 in group 306 and two more on the loading perches 106 in group 308.

In FIG. 3A, ten of the twenty UAVs 102 are shown parked and charging on various perches 106 in roost 300 while the other half of the UAVs are out on delivery runs. One loading perch 106 in group 308 is shown as occupied, while the other is depicted as vacant. Delivery vehicle 320 may include any number of package storage areas 314, 316 configured to store packages 104 for delivery. To facilitate loading and unloading of the packages 104 to or from a particular UAV 102, perches 106 in group 308 may include apertures 238 that open to a package storage area 316, as shown in FIG. 6B.

Package storage areas 314, 316 may include arrays of storage shelves that secure packages while road vehicle 320 is in motion. For example, as shown in FIG. 6B, each array in package storage areas 314, 316 may include twelve columns that store ten packages each, for a total possible storage of one hundred and twenty packages. Four such arrays may be formed on both sides of two aisles in package storage areas 314, 316 for a total storage capacity of four hundred and eighty packages. For example, package storage areas 314, 316 may be configured to store packages of a maximum size of 500 mm×400 mm×200 mm, in one embodiment.

Within package storage area 316 may be robotic automation equipment 318 that is operable to retrieve a package from package storage area 314 or 316 and load the package onto a UAV 102 via aperture 238 in the corresponding loading perch 106. For example, equipment 318 may be a movable elevator that can move up or down within package storage area 314 and/or 316 to access any level of storage shelf on either side of an aisle. Equipment 318 may also be used to deposit a package into package storage area 314 or 316. For example, a UAV 102 may land on either of the perches 106 in group 308 and hand off the package to equipment 318 for storage in one of package storage areas 314, 316.

In one embodiment, road vehicle 320 may include a spherical camera 302 that the that the control system uses to survey the area for air traffic, watch departing and arriving UAVs to verify flight parameters, and/or provide security surveillance for the entire operation. In some cases, road vehicle 320 may also include other sensors such as one or more microphones configured to listen for aircraft or localize and report on nearby gunshots.

Vehicle 320 may also include various systems to support UAVs 102, perches 106, and the robotic warehouse. In some embodiments, vehicle 320 may be equipped with power systems to charge UAVs 102, provide heating or cooling to UAVs 102, etc. For example, if all twenty UAVs are charging at full 2 kW capacity, up to 40 kW of electrical power may be required to run perches 106. However, a more reasonable design limit would be 20 kW. In addition, vehicle 320 may include various computing equipment to manage the control and communications for the UAV flock and vehicle 320. To support this, vehicle 320 may include an oversized generator driven by the truck engine, a separate genset, batteries, or a shore power connector that can plug vehicle 320 into the power grid when parked. This power is distributed to some or all of perches 106, the warehouse robot equipment 318, and other vehicle loads. As detailed above, perches 106 may also provide cooling to docked UAVs 102 during charging, in one embodiment.

Example computing equipment that may be located on vehicle 320 may include a controller system responsible for the centralized coordination of UAV operations, including scheduling, route planning, resource management, security, safety monitoring, testing of UAVs, inventory, analytics, and/or other functions. A communications subsystem of vehicle 320 may manages data links from the truck to the Internet. For example, such a communication system may use satellite, 3G/4G cellular, or other wireless connections. Alternatively, or in addition to, vehicle 320 may be configured to communicate via a wired connection (e.g., fiber, Cat 5, etc.) if vehicle 320 is parked. Orders, status updates, air traffic control messages, and/or remote telemetry from all UAVs 102 may use these Internet connections. In some cases, vehicle 320 may also use various short-range communication mechanisms to communicate with the UAV flock. For example, vehicle 320 may communicate with UAVs 102 via wireless channels, optical data links and/or beacon lights provided by perches 106 or otherwise integrated into roost 300.

An operator console may be located in the front passenger seat of road vehicle 320, allowing the driver or copilot to monitor and manage the operation of storage areas 314, 316 and all UAVs 102 in the flock. If a UAV on a delivery run is having difficulties (e.g., the UAV cannot locate an address, cannot find a good place to land, is under attack, is having a mechanical or electrical problem, etc.) the user console can function as a manual pilot station, and the human can guide that UAV out of trouble, in one embodiment.

The computing infrastructure of vehicle 320 may use fog computing techniques to minimize the load on the Internet links used by vehicle 320, improve latency, and provide service robustness. The local server and communication routers associated with roost 300 may be selected to have adequate processing, storage, and networking capabilities to support most of the roost's and flock's operations without extensive Internet or cloud interactions. The extremely low latency of fog computing may support the real-time critical functions of the roost, especially pre-flight UAV tests and approach and landing functions. Even if connection to the Internet is completely unavailable from vehicle 320, the local fog resources can continue to operate most aspects of the delivery service.

An example of roost 300 in operation is as follows. First, the driver of vehicle 320 may drive and park vehicle 320 in a location that is within UAV range of all delivery addresses. Next, roof 312 is retracted and UAVs 102 and perches 106 are enabled. A particular UAV 102 located on a storage perch 106 in group 306 may then be assigned to a particular delivery order by the local server. The particular UAV 102 may then undergo a pre-flight self test procedure while still anchored magnetically to its perch 106. If the test passes, the UAV 102 may be launched from the storage perch 106 in group 306 and makes a very short flight to an unoccupied loading perch 106 in group 308. The UAV 102 may use the beacon lights on the loading perch 106 to align itself to the landing post of the perch, and the loading perch's landing posts magnetically attract and anchor the particular UAV 102. If necessary, a quick charge is performed by perch 106 (e.g., by supplying power and/or coolant to the UAV).

Once the particular UAV 102 is ready to receive a package, equipment 318 then locates the package on a shelf within package storage area 314 or 316, moves its frame across the rails to the lateral position of the package in the shelf array, moves an elevator up the frame to the vertical level of the package, grabs the package off the shelf with a gripper, and draws the package onto an elevator platform in its rack. Next, equipment 318 moves under the corresponding loading perch 106 below the particular UAV 102. The particular UAV 102 is then commanded to grasp the package (e.g., mechanically, magnetically, etc.) and equipment 318 drops back down after the package is coupled to the UAV 102. Camera 302 may then survey the area to verify that the airspace around vehicle 320 is clear of other aircraft and other obstructions. Any last-minute updates to the flight plan of the particular UAV 102 may then be uploaded to it via an optical data link provided by perch 106. Finally, the particular UAV 102 may perform another pre-flight self test before being launched, potentially with the aid of electromagnets located on perch 106.

Continuing the example above, the particular UAV 102 out for delivery may use GPS and/or terrain data to navigate to its programmed destination. Once delivery is complete, the particular UAV 102 then takes off again for its return flight to roost 300, potentially with a new package received from the delivery location. When the particular UAV 102 is approaching the location of roost 300 (e.g., vehicle 320 has moved since the particular UAV 102 was sent out for delivery), the particular UAV 102 may notify roost 300 of its arrival, to initiate a landing sequence. Roost 300 may then select an appropriate perch 106 and notify the particular UAV 102 of the selected perch. Camera 302 may also survey the area to ensure a safe landing. For example, roost 300 may coordinate the landing with other landings and takeoffs, to avoid a midair collision. As the particular UAV 102 approaches the selected perch 106, it may use the beacons on perch 106 to align itself (e.g., beacons 234), and may be anchored to the selected perch magnetically (e.g., via electromagnetic coils 226). Once docked, the perch 106 may provide the particular UAV 102 with coolant, heating, and/or an electrical charge, to charge batteries 212 of the UAV 102. During this time, the particular UAV 102 may also download delivery logs to the perch 106 via a high speed optical data link (e.g., via lens 240). The particular UAV 102 may idle in its docked state until its controller determines that it has taken on enough energy to safely complete the next scheduled delivery. This process may be repeated any number of times until the packages in areas 314-316 have been delivered. At this point, all UAVs 102 may be recovered and secured in roost 300, and vehicle 320 may be driven back to its distribution center to be refilled.

In another example scenario, the charging and package loading of a particular UAV 102 may be reversed from the above example. For example, a returning UAV 102 may land on a loading perch 106 in group 308 to receive its next package and then hop to another perch 106 in group 306 to recharge. Once several UAVs 102 with packages to be delivered in approximately the same direction have accumulated sufficient charge, they may be launched nearly simultaneously and fly in a formation for most of their journeys (e.g., in a "V" shaped formation). Doing so may improve the safety of UAV operations, simplify air traffic control, and may even reduce energy consumption by the UAVs.

Reloading of road vehicle 320 may be performed at a distribution center equipped with conveyor belts and using equipment 318 to load the packages into areas 314 and 316. For example, a truck may be reloaded with another four hundred and eighty packages in approximately half an hour via this method. Alternatively, empty storage racks from areas 314-316 may be unloaded from vehicle 320 and replaced with pre-filled racks at the distribution center. In doing so, this may reduce the reloading time of vehicle 320 to approximately two minutes or less using automated equipment. As the UAVs and trucks are expensive resources, operational efficiency of the delivery service can be improved if truck turn-around time is minimized using these techniques.

Further implementations may entail the deployment of landing perches 106 at various locations throughout a geographic area, such as on the roof of a business. For example, a local restaurant or pharmacy may deploy a roost of one or more perches 106, to deliver goods to nearby customers. Such a rooftop implementation may entail deploying a roost having one loading perch and a configurable number (e.g., one, two, four, six, eight, etc.) of storage/charging perches surrounding the loading perch (e.g., similar to those in group 306). An elevator from the loading perch may pass down through the roof of the business to a workstation. An employee then fills an order (e.g., from an associated e-commerce site), packages the food or goods, and places it on the elevator for loading into a UAV. The delivery and UAV flock management then proceed as described above.

In yet another deployment scenario, a roost 300 of perches 106 may be implemented that serves a large number of delivery addresses within UAV flight range of a major urban distribution center of a company. Such a roost may be built from a number of modules, similar to the 8'×20', 18 storage+2 loading perch design illustrated in FIGS. 3A-3B. The loading doors of the perches may be served by conveyor belts to the automated warehouse of the distribution center. If space is a concern, the roost design may be stacked in tiers, permitting upwards of two hundred UAVs to be densely docked, charged, and loaded in approximately the same space occupied by a single semi-trailer loading dock. Alternatively, the roost may be located within the warehouse itself, with the UAVs entering and exiting by a small door.

Figure 4:
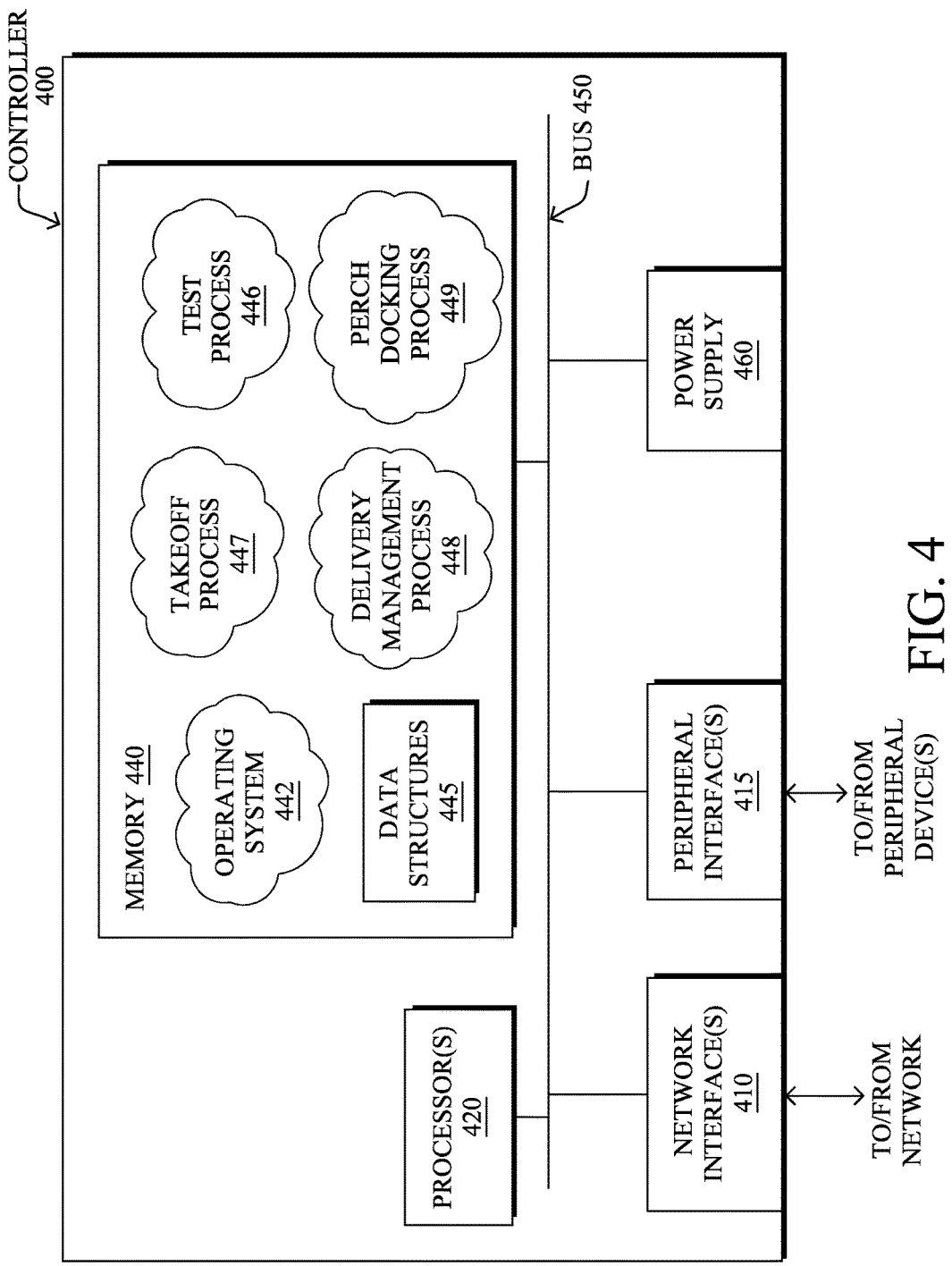
FIG. 4 illustrates an example device controller.

FIG. 4 is a schematic block diagram of an example device controller 400 that may be used with one or more embodiments described herein. For example, controller 400 may be local to UAV 102, landing perch 106, or be in communication therewith, to provide control over the package delivery process. Controller 400 may include one or more network interfaces 410, one or more peripheral device interfaces 415, one or more processors 420, and a memory 440 interconnected by a system bus 450 and powered by a power supply system 460.

The network interfaces 410 include the mechanical, electrical, and signaling circuitry for communicating data over wireless and/or wired links of a communication network. In one embodiment, network interfaces 410 preferably include a wireless interface that supports Wi-Fi, cellular, or other wireless technologies to connect landing perch 106 and/or UAV 102 to a nearby Wi-Fi network, 3G/4G cellular data network, or the like. In another embodiment, network interfaces 410 include an interface for a hardwired network connection such as a 100 Mb/s Power over Ethernet (PoE) port. This not only provides data interconnect, but can also provide the power needed to run the device over the same physical cable. In another embodiment, network interfaces 410 may include a near-field communication interface that uses Bluetooth or any of the emerging Internet of Things (IoT) wireless options, to communicatively connect UAV 102 and/or landing perch 106 to any other nearby device. In further embodiments, network interfaces 410 may be configured to provide an optical data link between landing perch 106 and UAV 102 (e.g., via one or more lenses 240 on landing perch 106).

Peripheral interface(s) 415 include the mechanical, electrical, and signaling circuitry for communicating data to and/or from any of the peripheral components of UAV 102 and/or landing perch 106. For example, controller 400 may provide control signals to any of coils 226 or to a pump or other mechanism used to force a heating or cooling medium through an aperture 230 on a post 222 of landing perch 106. In another example, controller 400 may receive sensor data from a sensor 232 on any of posts 222-224 of landing perch 106. Further peripherals that may receive control commands from controller 400 and/or provide data to controller 400 via interfaces 415 may include, but are not limited to, cameras (e.g., camera 236, camera 216, etc.), microphones, security sensors, marker lights (e.g., beacon lights 234), keypads, electronic displays, environmental sensors/monitors, or the like.

Power supply system 460 may be configured to provide power to landing perch 106 and/or to UAV 102. In some embodiments, power supply system 460 may receive energy over a PoE network interface 410, from a solar panel (e.g., located at the top of smart postal box 102), via an AC power supply line (e.g., a buried 12V AC distribution line), or from a storage cell (e.g., a battery, an ultra-capacitor, etc.). In some cases, power supply 460 may provide power to both controller 400 and to the various systems/components of the controlled device (e.g., landing perch 106, UAV 102, etc.). In further embodiments, power supply system may include one or more batteries, such as batteries 212. As would be appreciated, power supply system 460 may be sized and configured accordingly, to accommodate any number of different devices and/or functions.

The memory 440 includes a plurality of storage locations that are addressable by the processor(s) 420 and the interfaces 410, 415 for storing software programs and data structures associated with the embodiments described herein. The processor 420 may comprise necessary elements or logic adapted to execute the software programs and manipulate the data structures 445. An operating system 442, portions of which are typically resident in memory 440 and executed by the processor(s) 420, functionally organizes data by, inter alia, invoking operations in support of software processors and/or services executing on controller 400. Illustratively, these software processes and/or services may include a takeoff process 447, a delivery management process 448, and/or a perch docking process 449, that are configured to perform the operations described herein.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

During operation, controller 400 may use cloud computing techniques (e.g., centralized processing from one or more remote servers) or fog computing techniques (e.g., extending the cloud computing paradigm to the edges of the network), to coordinate the operations of all of the sensors, actuators, and networking functions of landing perch 106 and/or UAV 102. For example, controller 400 may not have a persistent Internet connection or have a limited bandwidth Internet connection. In such cases, controller 400 may be configured to exchange data (e.g., delivery confirmations, status information, compartment requests, etc.) with another device (e.g., a delivery vehicle, a user device, etc.) that forwards the information to a central server.

In some embodiments, delivery management process 448 may be operable to coordinate the delivery of a package via UAV 102. For example, delivery management process 448 may associate a particular UAV 102 with a particular package 104, a scheduled delivery or pickup time, a delivery or pickup location, security information associated with a pickup or delivery, or any other information used to define how, when, or where a pickup or delivery is to occur. In some cases, delivery management process 448 may communicate with a centralized server via the Internet or a private network, to coordinate deliveries.

In further embodiments, takeoff process 447 and perch docking process 449 may be operable to control the takeoff of a UAV 102 from a perch 106 and the landing of the UAV 102 onto perch 106, respectively. Takeoff process 447 may, for example, be executed by UAV 102 and/or landing perch 106, to perform a pre-flight self test for UAV 102 (e.g., to ensure a valid flight plan, to coordinate UAV air traffic, etc.). Conversely, perch docking process 449 may be operable to ensure that UAV 102 lands correctly onto landing perch 106 (e.g., by aligning UAV 102 onto posts 222-224 using beacon lights 234, sensors 232, etc.).

Referring again to FIGS. 2A-2B, controller 400 associated with UAV 102 and/or landing perch 106 may control the landing of UAV 102 onto landing perch 106 (e.g., using perch docking process 449), as follows. First, UAV 102 and/or landing perch 106 may detect the presence of one another. For example, landing perch 106 may determine that UAV 102 is within a predefined distance or arrival time based on data communicated between UAV 102 and landing perch 106 directly (e.g., via an optical link, a near-field communication link, etc.) or from a centralized server that maintains location information for UAV 102. Alternatively, or in addition thereto, landing perch 106 may detect the presence of UAV 102 via sensors associated with landing perch 106 (e.g., camera 236, etc.). UAV 102 may determine its proximity to landing perch 106 via similar mechanisms (e.g., by detecting beacon lights 234 on landing perch 106, based on data received from landing perch 106, etc.).

Once UAV 102 is within close proximity above landing perch 106, it may align itself such that posts 222-224 are aligned with the corresponding apertures 202-204 of UAV 102, and begin lowering itself onto landing perch 106. As described previously, landing perch 106 may energize coils 226 during landing, to interact with permanent magnets 206 in UAV 102. Notably, if the UAV magnets 206 have their south poles pointing down (e.g., in the −Z direction shown), and the polarity of current flowing in the coils 226 causes the top surfaces of the posts to be north poles, a strong attractive force would be generated. This will effectively suck UAV 102 onto landing perch 106 and into a fully-seated position as soon as coils 226 come within range of magnets 206.

In some embodiments, position and rate of decent sensors (e.g., sensors 232, etc.) may monitor the final landing of UAV 102 onto landing perch 106. Perch docking process 449 may then use this sensor data as feedback to modulate the current provided to coils 226, thereby ensuring a soft landing. As would be appreciated, landing can be a risky time for UAVs, especially in windy conditions, so making the landings quickly yet softly may improve UAV operations.

Once UAV 102 is docked, landing perch 106 may continue to power coils 226, in some embodiments. Notably, if coils 226 are left energized in the same polarity as during landing, coils 226 and magnets 206 may continue to provide a retaining force between UAV 102 and landing perch 106. In various cases, the amount of current supplied to coils 226 may be varied during landing and after landing, depending on the amount of security needed, etc. By forcefully securing UAV 102 to landing perch 106, this may prevent high winds from blowing UAV 102 away and may even deter people from stealing or vandalizing UAV 102.

Also as noted previously, electromagnetic coils 226 may be energized by takeoff process 447, to facilitate launch of UAV 102 from landing perch 106. In particular, if the polarity of current in coil 226 is momentarily reversed and switched to a high power (e.g., making the top surface of the post a strong south pole), a strong repulsive force is created, capable of boosting UAV 102 into the air with significant upward momentum. This launch assist can reduce the energy consumption of UAV 102 on takeoff, and can enable slightly higher payload capacity. Providing a launch force can also overcome any friction between posts 222-224 and apertures 202-204 caused by dirt, ice, etc. For example, providing a launch force may allow UAV 102 to climb a few meters high in approximately one second, getting UAV 102 out of the space occupied by people, animals, and ground vehicles, thereby improving operational safety. Similar to landing, the launch current can be modulated based upon position sensors in the posts (e.g., sensors 232) and/or accelerometers in UAV 102, to ensure the takeoff loads are within the design limits of the UAV and its cargo.

Takeoff process 447 and/or perch docking process 449 may use sensor data from sensors 232 as follows. In some embodiments, sensors 232 may be load cells operable to measure the three dimensional forces associated with posts 222-224. In one embodiment, takeoff process 447 may use sensor data from sensors 232 to verify that UAV 102 is correctly docked with all of posts 222-224 and completely seated in the corresponding sockets/apertures 202-204 on landing. In another embodiment, processes 447, 449 may use sensor data from sensors 232 to measure the wind load on a docked UAV 102 (e.g., to determine whether safe operation of UAV 102 is possible). In a further embodiment, if a thief attempts to remove UAV 102 from perch 106, landing perch 106 may use sensor data from sensors 232 to detect the attempted theft and generate an alarm. In yet another embodiment, takeoff process 447 may use sensor data from sensors 232 to measure the total takeoff weight of UAV 102 and its cargo to ensure safe limits (e.g., due to UAV 102 operational limitations, based on any regulatory limits on weight, etc.), prior to launch.

In various embodiments, takeoff process 447 may use sensor data from sensors 232 as part of a pre-flight test for UAV 102. For example, if the rotors of UAV 102 are energized at flight power while UAV 102 is still magnetically coupled to landing perch 106, sensors 232 may measure the upward and lateral forces on UAV 102. In this way, takeoff process 447 may verify that all rotors and flight controls are functioning normally at full flight power, while UAV 102 is safely retained on perch 106 by the electromagnets. While still docked, UAV 102 may also cycle through various simulated flight maneuvers (e.g., rising, hovering, descending, turning, banking, etc.), allowing takeoff process 447 to use sensor data from sensors 232, to verify that the correct forces are acting on the airframe for each maneuver.

Takeoff process 447 and/or perch docking process 449 may calculate various forces experienced by UAV 102 using sensor data from sensors 232. For example, processes 447, 449 may measure the lift forces on UAV 102 by summing the upward forces (e.g., along the +Z-axis shown) on all posts 222-224. In another example, processes 447, 449 may determine pitch forces by calculating the Z-axis force readings between opposing front and back posts of landing perch 106. In a further example, processes 447, 449 may measure roll forces by calculating the measured force difference between left and right posts of landing perch 106. Processes 447, 449 may also determine yaw forces as a circular vector of X-Y forces on all posts 222-224. Processes 447, 449 may further determine hovering forces in the X-Y plane by calculating the amount of X and/or Y-axis displacement forces exerted on posts 222-224 in the same direction. Using the weight of the loaded UAV 102 measured while its rotors are powered down, and the upward force measured while UAV 102 is at full rotor power, it is possible for processes 447, 449 to estimate the rate of vertical acceleration UAV 102 will achieve once released. Once UAV 102 has completed its test sequence, and all load cell readings from sensors 232 are verified as within acceptable limits, electromagnetic coils 226 are reversed, and UAV 102 can be launched with confidence that all systems are operating correctly. Without sensors 232, there is no high-confidence way to do these extensive pre-flight tests without actually launching UAV 102 and testing flight dynamics in mid-air.

In some embodiments, the pre-flight test run by takeoff process 447 may be augmented with network-based resources. Notably, in some implementations, landing perch 106 may have limited information regarding the characteristics of UAV 102 and its payload and/or the appropriate test sequences to verify correct operation of UAV 102. In such cases, if landing perch 106 is connected to the Internet or to a private network, it may receive the characteristic information and/or testing routine from a remote server that maintains this data.

Figure 5:
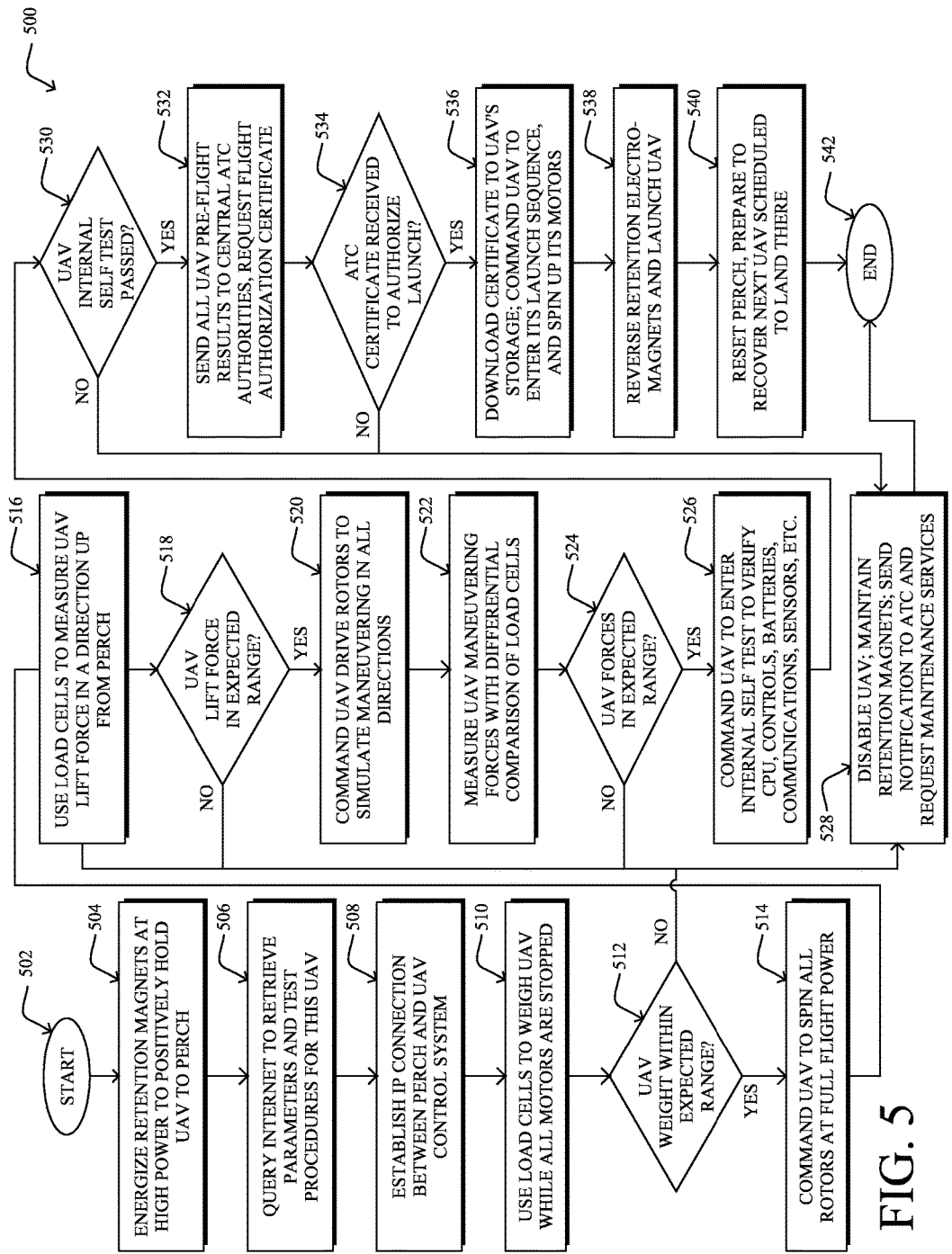
FIG. 5 illustrates an example procedure for performing a pre-flight test for a UAV.

Referring now to FIG. 5, an example procedure for performing a pre-flight test of a UAV is shown, according to various embodiments. In various embodiments, procedure 500 may be performed by one or more controllers associated with a UAV and/or a corresponding landing perch on which the UAV may be stored. For example, procedure 500 may be performed by controller 400 which may be located internally to the UAV itself, to the landing perch for the UAV, located within a roost of perches and in communication with a particular perch, or may even be located remotely to the perch/roost. Procedure 500 may begin at step 502 and continue on to step 504 where, as described in greater detail above, the landing perch energizes its retention magnets, to positively hold the UAV in place. In one embodiment, the landing perch may provide a maximal amount of power to its retaining coils, to provide a maximal amount of retention force to the UAV during the pre-flight test.

At step 506, the controller of the landing perch may query and retrieve any necessary characteristics of the docked UAV and/or any test procedures specific to the type of UAV. Example characteristics of the UAV may include, but are not limited to, acceptable weight ranges for the UAV (e.g., loaded and unloaded weights), thrust characteristics of the UAV, communication protocols associated with the UAV, and the like. Similarly, the test procedure may define the acceptable ranges of operating parameters of the UAV such as weight, forces measured during pre-flight maneuvering tests, and the like. Such information may be retrieved, for example, from a server associated with an air traffic control, the manufacturer of the UAV and/or landing perch, the delivery service, or another cloud-based UAV management authority. To ensure security, both the request and response may be encrypted, in some embodiments.

At step 508, the landing perch establishes a connection with the UAV. For example, the landing perch may establish an Internet Protocol (IP) network connection with the UAVs internal controller, to initiate the pre-flight test. Other suitable communication protocols may be used in other embodiments.

At step 510, the controller of the landing perch may use its load cells (e.g., sensors 232, etc.), to weigh the docked UAV. In some cases, the landing perch may perform this weight check prior to the UAV starting its motors. Depending on the type of landing perch and/or the actions of the UAV, the UAV may be weighed in either an encumbered state (e.g., with a loaded package) or unencumbered state.

At step 512, a decision is made as to whether or not the weight measured in step 510 is within an acceptable range. For example, the measured weight may be compared to the expected weight of the UAV and any payload, to ensure the weight falls within the expected range and complies with any legal requirements. If the measured weight is within its expected range, procedure 500 may continue on to step 514. However, if the measured weight of the UAV is outside of the acceptable range, procedure 500 may continue to step 528.

If the results of the weight test in step 512 are acceptable, a number of flight power tests may be performed, to determine if the UAV is able to generate adequate lift and/or appropriate maneuvering forces. In general, each test involves the landing perch commanding the UAV to spin its rotors as it would to perform some in-air maneuver (e.g., climb, turn, bank, etc.) while still docked with the landing perch. Said differently, the controller of the landing perch may instruct the UAV to perform one or more preflight test operations while still docked to the landing perch, as part of the preflight test routine. Sensors local to the landing perch (e.g., sensors 232) may then measure the resulting forces on the UAV along one or more axis and compare the measurements to the expected forces specified by the received test routine for the UAV.

At step 514, the controller of the landing perch may initiate a test of the vertical lift force generated by the UAV by instructing the UAV to spin all of its rotors at full power. As described previously, the UAV may be retained in place during this test via electromagnets local to the landing perch and/or UAV. Then, at step 516, the sensors of the landing perch may be used to measure the resulting lift force exerted when the UAV spins its rotors. The controller of the landing perch then makes a determination at step 518 as to whether or not the measured lift force exerted by the UAV is within an acceptable range. If it is not, procedure 500 may continue on to step 528. However, if the tested lift force of the UAV is acceptable, procedure 500 may continue on to step 520.

At step 520, the controller of the landing perch may initiate a test of one or more maneuvers of the UAV that the UAV may perform in-flight. For example, the landing perch may instruct the UAV to simulate maneuvering in any or all directions (e.g., hovering in a stationary location, hovering in a particular direction, mid-flight turning, etc.). At step 522, sensors on the landing perch measure the resulting forces in one or more dimensions and the controller of the landing perch. Then, at step 524, the controller of the landing perch determines whether the one or more measured forces in step 522 are within acceptable range. If so, procedure 500 may continue on to step 526. However, if the UAV fails the maneuvering test, procedure 500 may continue on to step 528.

If the UAV passes all of the tests in steps 512, 518, and 524, procedure 500 may continue on to step 526 where the controller of the UAV commands the UAV to perform a self test of any or all of the internal systems of the UAV. For example, the controller of the UAV may check its motor currents, motor control circuits, batteries, flight computers, communications systems, sensors, any intelligence in the payload, or any other UAV systems, to determine whether the internal systems of the UAV are performing within acceptable limits.

At step 530, a decision is made as to whether or not the systems of the UAV are operating within acceptable limits. In one embodiment, the controller of the landing perch may make the determination based on feedback received from the UAV. In another embodiment, the controller of the UAV itself may make the determination and provide an indication of the determination back to the controller of the landing perch. In either case, if the UAV fails the system check, procedure 500 may proceed to step 528. Otherwise, procedure 500 may continue on to step 532.

At step 532, the controller of the landing perch may request flight authorization for the UAV from an air traffic control (ATC) service. Such a request may, for example, include the pre-flight test results of steps 512, 518, 524, and/or step 530, to validate that the UAV has passed all necessary pre-flight checks. In further embodiments, the flight authorization request may also include flight details such as the location of the landing perch, the delivery or pickup location, timing information for the launch, a requested flight plan, or the like.

At step 534, the controller may determine whether or not the ATC service authorized the launch of the UAV. In one embodiment, the controller may receive a flight authorization certificate from the ATC service (e.g., via a secure IP network connection, etc.), if the UAV is cleared for launch. However, if the UAV is not cleared for launch, the controller may determine that the UAV was not cleared based on a negative response received from the ATC service or after a timeout period after requesting flight authorization. In such a case, procedure 500 may continue on to step 528. However, if the UAV was cleared for launch, procedure 500 may continue on to step 536.

At step 536, the controller may download the flight authorization to the UAV (e.g., a certificate, etc.) and instruct the UAV to begin its launch sequence. Such a launch sequence may entail, for example, the UAV starting its rotors and notifying the landing perch when the UAV is ready for takeoff.

At step 538, as detailed above, the landing perch may reverse the polarity of its electromagnetic coils, to provide additional launch force to the UAV. In one embodiment, the landing perch may also make one final check to ensure that there are no obstructions in the local area or airspace (e.g., via a camera feed, other sensors, etc.). Once the launch path is clear, the landing perch may reverse the polarity of its electromagnets, thereby launching the UAV into the air.

At step 540, the controller may reset the perch to prepare the perch for the next UAV scheduled to land. For example, the controller may cause the perch to replenish any heating or cooling media supplied by the perch to a UAV. In another example, the controller may download any configuration and/or test procedures associated with the next UAV, prior to the next UAV landing (e.g., by performing step 506). Procedure 500 then ends at step 542.

If the UAV fails any of the pre-flight test operations of steps 512, 518, 524, 530 (e.g., any of the operations in the pre-flight test routine), or fails to be authorized for launch in step 534, procedure 500 may continue on to step 528 where the controller of the landing perch disables the UAV. For example, the controller may instruct the UAV to stop spinning its rotors or power down until instructed otherwise. In some cases, the landing perch may continue to supply power to the electromagnets holding the UAV in place, even if the UAV fails the tests in steps 512, 518, or 524 (e.g., to prevent the UAV from being blown away by wind, to prevent theft of the UAV, etc.). In one embodiment, the controller may also provide a notification to the centralized server (e.g., of the air traffic control service, etc.), indicating that maintenance of the UAV is required. Procedure 500 then ends at step 542.

Figure 6:
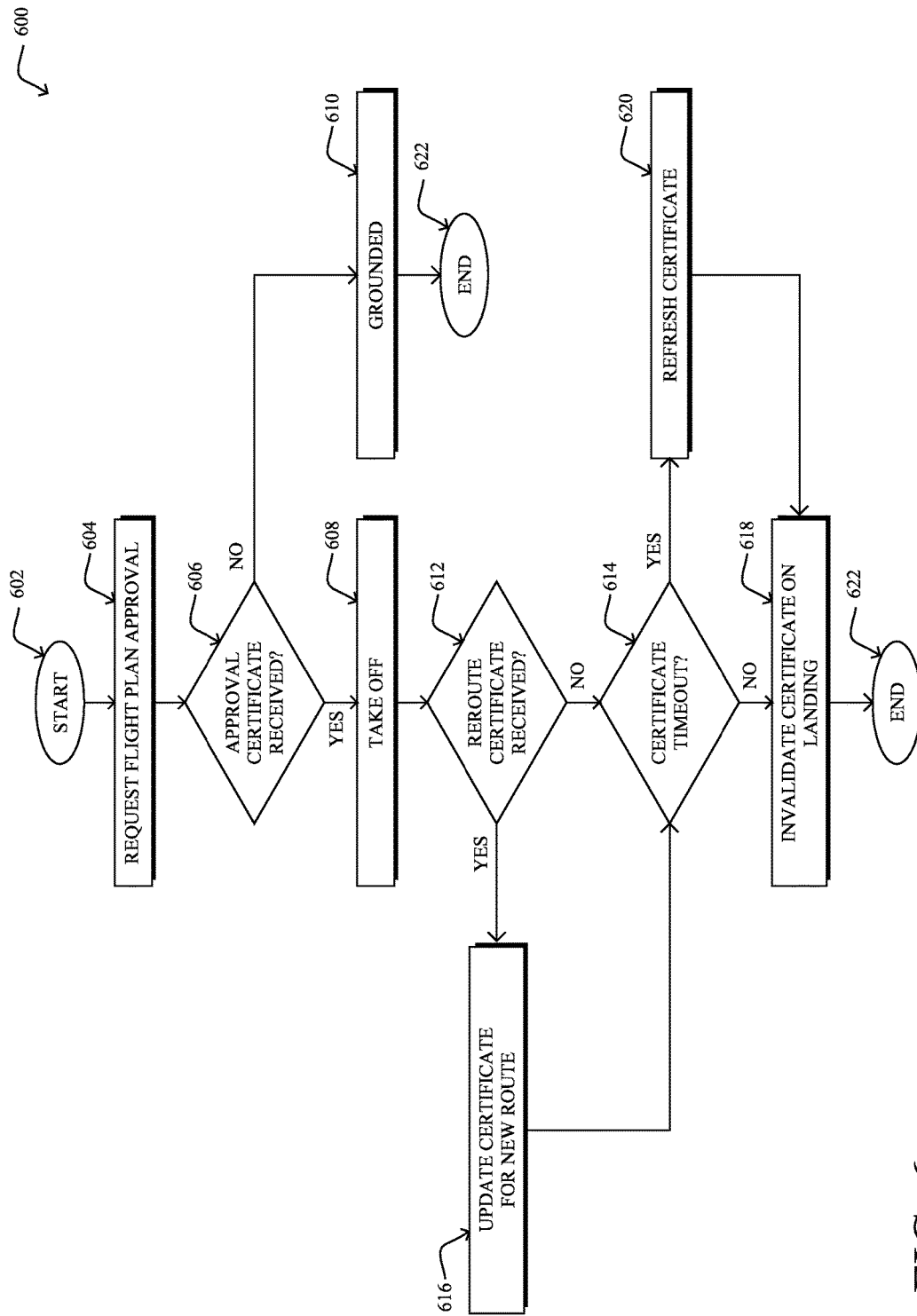
FIG. 6 illustrates an example procedure for authorizing a UAV flight plan.

Referring now to FIG. 6, an example procedure for authorizing a UAV flight plan is shown, according to various embodiments. In general, procedure 600 may be performed by a controller of a UAV, a controller of a landing perch for a UAV, a server associated with a UAV delivery system, or by such devices working in conjunction with one another. Procedure 600 may begin at step 602 and continues on to step 604 where the device requests flight plan approval from an ATC service. In some embodiments, prior to a UAV being launched from a landing perch, the controller of the UAV or landing perch may generate a certificate signing request (CSR) that includes various information and provide the request to the ATC service. For example, such a request may include the make or model of the UAV, a call sign of the UAV, a measured weight of the UAV, a flight class of the UAV, an operator identifier, cargo information, a network address associated with the UAV (e.g., a wireless IPv6 address, etc.), flight plan, or any other information that may be used by the ATC service to clear the UAV for launch. In some embodiments, the controller may provide the request to the ATC service via a secure web interface.

At step 606, the controller determines whether a flight approval certificate was received from the ATC service in response to sending the request in step 604. If approved, ATC service may issue a digital certificate with a specific validity time as well as a unique transponder code, in one embodiment. The UAV must then takeoff within this time and only maintain flight while the certificate is valid. In further embodiments, the certificate may include route of flight information, thereby authorizing the UAV to operate along the corresponding route. Thus, the ATC service may maintain a record of the UAV's flight plan and track the movement of the UAV via radar using the transponder code included in the certificate.

At step 608, the controller causes the UAV to take off, if the controller determines that a flight approval certificate was received in step 606. The UAV may then travel along the approved flight plan towards its destination. However, if the controller determines that an approval certificate was not received, procedure 600 may continue on to step 610 where the UAV is placed into a grounded state. In various embodiments, the controller may determine that an approval was not received either based on a notification from the ATC that the flight plan was rejected or based on a predefined timeout (e.g., if the controller does not receive an approval within a threshold amount of time after requesting approval). In the grounded state, the controller may wait a certain amount of time before resubmitting the request for flight plan approval or submitting a new request with a different flight plan. In some cases, the controller may even halt operation of the UAV until receiving an unlock command or flight plan approval from the ATC service. Procedure then continues on from step 610 to step 622 and ends.

At step 612, while the UAV is traveling to its destination, the UAV controller may determine whether or not a reroute certificate is received. Notably, if the ATC service requires that the UAV divert its flight path, the service may send a modified flight plan signed using the same root certificate to the controller. If the controller determines that a reroute certificate has been received, procedure 600 may continue on to step 616 where the controller updates the UAV's flight plan certificate with the reroute certificate.

At step 614, the UAV controller may also monitor the current certificate (e.g., either the original approval certificate or the reroute certificate from step 616), to determine whether the validity time associated with the certificate has expired. If the certificate has expired or is about to expire (e.g., within a threshold amount of time), procedure 600 may continue on from step 614 to step 620 where the controller refreshes the certificate. In one embodiment, the controller may refresh the certificate by sending a refresh request to the ATC service for additional time to complete the delivery route. In another embodiment, the UAV may be required to land (e.g., at the nearest perch) until the certificate is refreshed.

At step 618, once the UAV has landed, regardless of whether the flight plan has been completed, the certificate may be invalidated, in some embodiments. Thus, the UAV may require a new certificate prior to taking off again. Procedure 600 then ends at step 622.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

Figure 7:
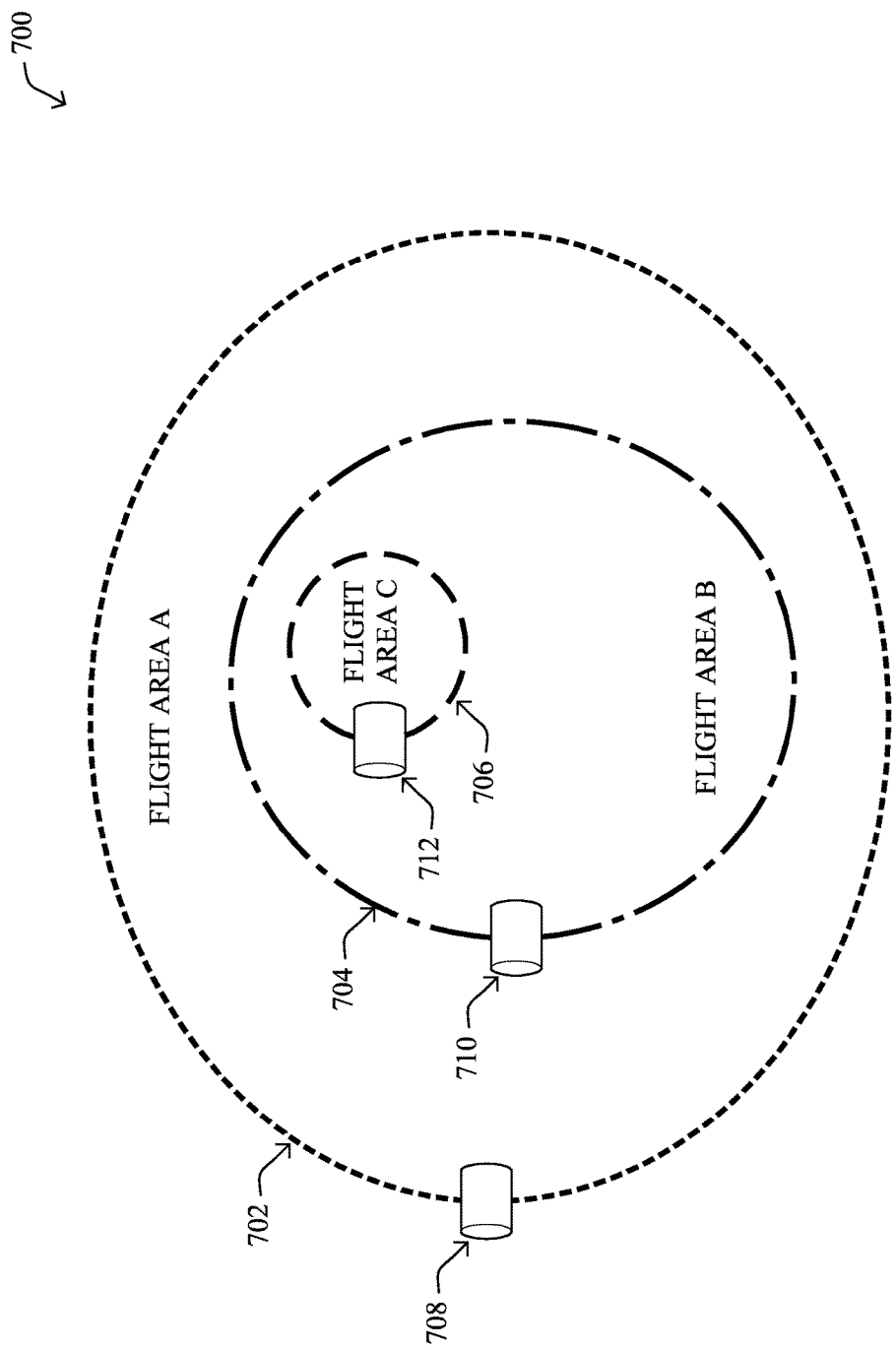
FIG. 7 illustrates an example set of flight areas for a UAV having different security requirements.

Referring now to FIG. 7, an example set of flight areas 702-706 for a UAV is shown having different security requirements. In some cases, an ATC or other regulatory authority may impose different restrictions on different areas for UAV travel. For example, as shown, assume that flight area 706 is the most restrictive area (e.g., an airport, military installation, etc.), flight area 702 is the least restrictive area, and flight area 704 has an intermediate amount of restrictions on UAV travel. As would be appreciated, any number of different types of flight areas may be used, each type having a different set of restrictions.

In various embodiments, each of flight areas 702-706 (e.g., flight areas A-C) may be bounded by a corresponding "virtual" fence (e.g., a set of coordinates/boundaries along the perimeters of flight areas 702-706). A UAV may compare its own location (e.g., obtained via triangulation, global positioning, etc.) to that of the virtual fences, to determine its own in-flight operations. For example, the UAV may be able to fly at different speed ranges and/or different altitude ranges, depending on any rules associated with the current flight area.

In some embodiments, each of flight areas 702-706 may include any number of ground inspection gateway stations 708-712 located at the perimeters of the virtual fences. During operation, a UAV may be required to visit such a station before crossing into a different flight area. For example, a UAV crossing from flight area 702 into flight area 704 (e.g., from A→B) may be required to check in at inspection gateway station 710 before entering flight area 704. In general, an inspection gateway station may be operable to validate the UAV, its flight plan within the new flight area, and/or the cargo being carried by the UAV.

In on example, a UAV may approach an inspection gateway station as follows. First, the UAV may land on a landing perch (e.g., perch 106) located on the outside of the virtual fence passing through the ground station. The flight certificate associated with the UAV may then be validated and the UAV may be prevented from being issued an authorization certificate for the new flight area until the inspection is complete. In one embodiment, the landing perch may be coupled to a conveyor belt, thereby dragging the UAV through one or more screening stations. Such stations may include, for example, X-ray scanners, nitrate sniffers, Geiger counters, radiological, nuclear, and explosives (CBRNE) detectors, scales, etc. The data from such detectors may be received by a local fog computing processor and compared with secure records from the ATC service to validate that the UAV and its cargo are consistent with approved UAV design and an authorized mission with the new flight area. In some embodiments, the UAV may also perform any number of self tests and include this information when requesting clearance.

After a short period of time, the UAV may be transported a few meters through a scanner array and through the virtual fence into the new flight area (e.g., a controlled airspace). If the UAV passes the various inspection checks, and the resulting tests match the expected results of the ATC service, the controller of the UAV may request a new flight approval certificate from the ATC service for flight within the controlled area. Such a request may include a special token issued by the ground inspection station that confirms that the UAV has passed the required test(s). After validating the token, the ATC service may issue a new flight certificate to the UAV covering operations within the new flight area (e.g., including the inspection token in the certificate). On reception of the flight certificate, the UAV may perform its normal pre-flight self test routines and take off from the landing perch within the new flight area.

As would be appreciated, the use of ground inspection stations across different flight areas may allow the detection of any number of threat scenarios. Such scenarios may include, for example, the clandestine use of UAV-based cameras within a restricted area, weapons of mass destruction (WMDs), illicit cargo, rogue flight plans, remote control structures, etc. For example, it may be extremely difficult to carry a significant amount of explosives via a UAV and get it through the scanner array, because the UAV would have a different X-ray image, weight, center of gravity, or electronic verification signature than the ATC-signed certificate indicated to the ground station. A UAV failing an inspection scan may not be issued a new flight certificate and may be retained in place on its landing perch (e.g., via electromagnets) until the UAV has been cleared by the authorities. In one embodiment, highly suspicious UAVs could be moved on an extension of the conveyer belt to a secure quarantine area within the ground inspection station.

All UAVs attempting to enter a new flight area may be required to submit to inspection at a ground station. Any UAV incursion into the new flight area detected by the ATC may result in the ATC service sending a "turn back" warning to the UAV. If the UAV does not respond, the ATC service may invalidate the flight certificate of the UAV (e.g., via a revocation message sent to the UAV), causing the UAV to land immediately. In some cases, sensors associated with the inspection gateways (e.g., radar, cameras, etc.) may be used to detect incursions into restricted flight areas by UAVs that did not submit to an inspection. Any rogue UAV that violates these protocols may be dealt with using whatever means are deemed necessary by law enforcement.

In terms of dynamic changes to flight areas while a UAV is in flight, the ATC service may send a reroute certificate to an in-flight UAV or simply invalidate the current certificate of the UAV, thereby forcing the UAV to land. Such a change in flight areas may be caused, for example, by a temporary flight restriction being imposed on a particular area. As noted previously, if the ATC service invalidates the certificate of the UAV, the UAV may be forced to land at the nearest landing perch in its current flight area and may not be allowed to take off again with requesting a new certificate.

Figure 8:
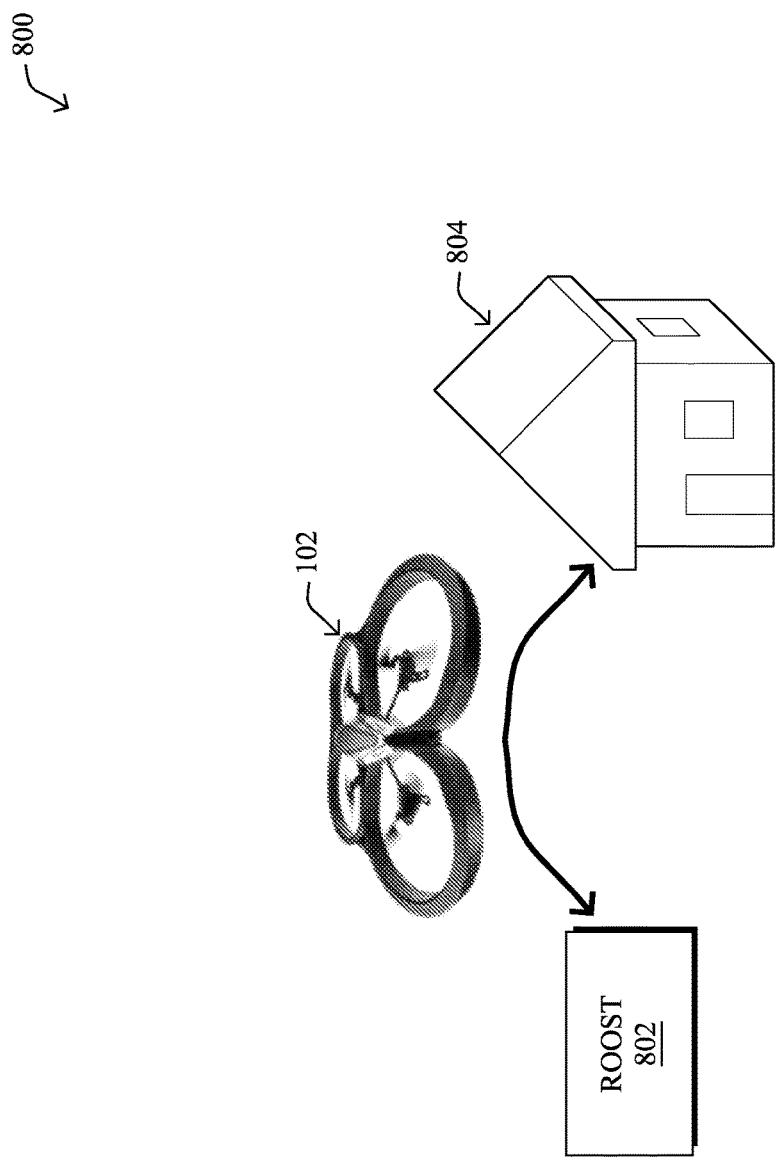
FIG. 8 illustrates an example of a UAV being used to deliver large data sets.

FIG. 8 illustrates an example of a UAV being used to deliver large data sets, in various embodiments. As would be appreciated, modern data access networks, particularly those used for residential applications, are often limited in terms of available bandwidth. For example, wireless networks such as 3G/4G cellular typically only support data transfer rates of several megabytes per second (Mb/s). In addition, many non-commercial networks are also typically oversubscribed, leading to many networks imposing data caps on their users. For example, if a given user exceeds 10 GB/month, the user may be charged a higher amount for any data beyond this limit. While fiber optic networks may support higher data transfer rates, the deployment of such services to residential customers is very limited.

Despite the limitations of many Internet access networks, applications continue to require more and more network resources. For example, data sets in support of big data applications (e.g., medical, mineral exploration, financial, media production, Internet of Things, etc.) can approach one terabyte in size. In a typical residential network that supports only 10 Mb/s data rates, such a data set could take up to ten days to transfer. In another example, ultra high definition (UHD) video programs, also sometimes known as 4K video, typically require data transfer rates of 25-100 Mb/s to stream, depending on the quality level, resolution, and compression rates of the video. At 10 Mb/s, a two hour long UHD video could take between 5-20 hours to download, making movies on demand impractical. Notably, streaming UHD content is often impossible in real-time on all but the fastest broadband connections, and then only on lightly loaded networks.

According to various embodiments, physically transporting digital media via UAV may allow for the quick transfer of large amounts of data to a location that has limited broadband services. For example, a dual layer Blu-ray disc has a capacity of 50 GB, which is adequate to store a short or highly compressed 4K movie, or one twentieth of a terabyte-sized data file (e.g., such a data set can be stored on twenty Blu-ray discs). These disks could be sent via parcel services (1-3 day time lag), recorded on demand at a local kiosk (1-2 hour time lag), or physically delivered by a UAV (30+ minute time lag). Once a UAV delivers the physical media to a subscriber's location, the subscriber must run outside to retrieve it, and there is always the danger the media could be damaged or stolen.

In some embodiments, as shown, a UAV 102 may be configured to operate as a flying cache to deliver large data sets to locations that are serviced by providers that have more limited networking capacities. For example, assume that location 804 is serviced by a broadband provider that supports transfer rates of only 10 Mb/s. In such a case, UAV 102 may provide a burst bandwidth equivalent on the order of 10 Gb/s to such a location, thereby transferring the data to location 804 faster and without placing an undue burden or excessive load on the network.

In some embodiments, UAV 102 may be based at a roost 802 that is serviced by a provider network that supports comparatively higher data transfer rates than traditional broadband networks. For example, roost 802 may be serviced by very fast fiber-based Internet links that support comparatively high data transfer rates (e.g., 10-100 Gb/s) in comparison to that of location 804. Such fiber terminals may be distributed throughout an area (e.g., every 1-5 km), similar to the network layout of today's cell towers. In one embodiment, roost 802 may be co-located with a cell tower or water tower and store one or more data delivery UAVs.

In one example of operation, assume that the subscriber at location 804 requests a high speed transfer of a large data set (e.g., by ordering a movie, by requesting a large file download from an enterprise server, by requesting an upload of a large file from a local device to the Internet, etc.) using their slow (e.g., cellular) or intermediate speed (e.g., broadband) Internet connection. In such a case, a server associated with the Internet provider may determine which roost is closest to location 804, and perform a rapid download of the requested content to the local storage cache of selected roost 802. An idle UAV 102 parked at roost 802 is then assigned the delivery mission, and the local cache of roost 802 electronically transfers the requested data into a large flash memory array resident to UAV 102 (e.g., into memory 440 via landing perch 106).

In some cases, more than one subscriber request can be aggregated into a single mission for UAV 102. For example, requests from the same geographic direction from roost 802 or from the same neighborhood and are received within a short time window may be grouped into a single mission for UAV 102. Download to UAV 102 may be performed at high bandwidth (e.g., 10-100 Gb/s), permitting several large data sets to be downloaded in only a few minutes. UAV 102 may also be charged and its flight instructions uploaded concurrently with the bulk data transfer.

Once the data to be delivered has been downloaded to UAV 102, UAV 102 may be launched from roost 802 and fly along its predetermined flight path to location 804. In some embodiments, UAV 102 may be of a class of UAVs that support higher velocities (e.g., 60 km/hr., etc.), so that any location within the service radius of roost 802 can be reached in less than five minutes.

On arrival at location 804, UAV 102 may transfer the data in any number of ways. In one embodiment, UAV 102 may hover outside of a selected window of location 804 and send a message to a specialized subscriber gateway box located at location 804, to indicate that UAV 102 is ready to transfer the data set. Such a box may include, for example, an optical transceiver to communicate with UAV 102, interfaces to one or more user devices (e.g., computers, televisions, etc.), and/or an internal cache operable to store the delivered data set. In response to receiving an acknowledgement from the gateway box, UAV 102 may orient its optical transmitter towards the gateway box, which may typically be located inside of a given window of location 804, and begin transferring the data set to the internal cache of the gateway box.

In one embodiment, the optical data link used by UAV 102 may operate in the near ultraviolet wavelengths, at a power level adequate to span the distance between hovering UAV 102 and the gateway box (e.g., ten or less meters). The optical systems of UAV 102 and the gateway box may be operable to support some beam divergence, to reduce the accuracy of alignment required during a data transfer. UAV 102 then uses this link to rapidly transfer the data set from its internal memory over the optical/laser link, through the window, into the optical/laser receiver on the gateway, and ultimately onto a high speed flash memory array in the subscriber gateway. In such a way, a full 4K UHD movie (e.g., 60 GB in size) can be transferred from UAV 102 into the memory of the gateway box within 12-48 seconds. A full terabyte data set would take approximately 3.5 minutes to download at 40 Gb/s.

Once UAV 102 has downloaded all the data requested at location 804, it disconnects its optical link, flies to the next address in its mission plan and repeats the process. Depending upon the design of UAV 102, its internal storage capacity, battery life, the geographic spread of the requesting addresses, and the size of the data sets, a dozen or more subscriber requests can be completed in a single mission in perhaps twenty minutes. Once all the delivery requests are satisfied, UAV 102 then returns to roost 802, where it is recharged and receives downloads for the next mission of data sets.

In some cases, UAV 102 hovering outside of a window of location 804 may not be practical for any number of reasons. For example, while this operation may work with multistory apartment high rises, the hovering operation may not be practical for locations that have a large amount of close foliage cover, etc. In addition, some users may express privacy concerns about UAV 102 hovering outside of a window, especially considering that the optical data transfer to the gateway box may require the user to open any blinds, shades, etc. in the window. Accordingly, in another embodiment, the gateway box may include an optical device (e.g., similar in appearance to a flashlight) with a lens in front and fiber optics running from its back to the subscriber terminal. The receiver could then be placed on the roof, near a mailbox, on the side of a house, etc. where UAV 102 can easily establish the optical link without obstruction or triggering a privacy concern. In yet a further embodiment, one or more landing perches 106 may be located at location 806 and be in high speed communication with the local network and/or device of the subscriber. In such a case, UAV 102 may simply land on the landing perch and initiate the transfer via the perch itself.

Once the requested data is stored on the subscriber terminal, several things can be done with the data. For example, the terminal may include a video decoder, media player, and HDMI interface capable of playing HDTV or UHD content directly into a TV or monitor. In another example, the subscriber terminal may transfer the delivered data to a local fileserver or computer for permanent storage or processing using Ethernet, USB, or Wi-Fi connections.

As would be appreciated, the process could also be reversed to upload data from location 804 to the Internet. In such a case, a large data set may first be copied to the flash storage in the subscriber terminal (which may happen as relatively slow speed), and a request is made to summon UAV 102. Once UAV 102 reaches location 804 and establishes a communication link with the subscriber terminal, the data may be uploaded to UAV 102 using any of the mechanisms described above. UAV 102 then returns to roost 802, uploads the data to a local cache of roost 802, and the data is then forwarded to its ultimate destination via the Internet using the high speed connection of roost 802. In some cases, users who perform lots of these uploads may receive a special version of the gateway that includes an upstream laser or other optical transmitter, supports a large bidirectional bandwidth (e.g., 40 Gb/s), and/or a larger cache (e.g., approximately one terabyte). Subscribers primarily performing downloads of more modest files or viewing video content may use a cheaper, receive-only version of the gateway, with a smaller cache (e.g., one quarter to one half of a terabyte).

In a further example, assume that streaming UHD video content requires a bandwidth of 64 Mb/s (e.g., very high quality at 4K resolution, moderately compressed at 8K, 3D capable). A two hour movie at this streaming rate plus metadata is approximately 60 GB in file size. A 64 terabyte roost cache (e.g., implemented as 8-16 parallel hard drives, or solid-state drives, for capacity and speed) can store the most popular 2,000 hours of programming, plus have some space to temporarily buffer user requested downloads and uploads. Such a roost server may be connected to the Internet backbone via a 100 Gb/s fiber connection, which can transfer a 60 GB movie from the Internet in less than five seconds assuming the far end file servers are similarly as fast. The roost cache may also be connected to each UAV perch 106 at 40 Gb/s, permitting the movie to be loaded into the memory of UAV 102 in about 12 seconds. In one embodiment, UAV 102 may include a massively parallel array of 64 high speed MicroSD flash storage modules, each 128 GB in capacity, for a total of 8 TB. This degree of parallelism may support the 40 Gb/s bandwidth into and out of the flash array, when each individual MicroSD module is capable of reading or writing at a maximum speed of on the order of 100 MB/s. In some cases, each UAV can store the top n-number of popular movies (e.g., 6 TB worth of data) pre-loaded in its cache, plus an additional 2 terabytes for less-popular user requests. Having popular content always loaded and flying with all UAVs can reduce the roost load times, and can also permit them to respond to requests for that popular content while in mid mission.

Continuing the above example, the UAV free space link at location 804 could also be 40 Gb/s, permitting the delivery of the requested movie to the in-home gateway in approximately twelve seconds. Lower cost designs for the gateway may use 10 Gb/s download speeds, which would require approximately 48 seconds of hover time to deliver the complete 60 GB film. In one embodiment, the gateway may include an internal cache comprising sixteen MicroSD modules of 32 GB each. Such modules may also be running in parallel, to support higher transfer rates to and/or from the UAV. Thus, the gateway device may store approximately half of a terabyte. A more expensive gateway design would use more, and/or faster flash technology that would be needed to keep up at 40 Gb/s download or upload speed. Other data transfer speeds, data storage capacities, and/or data storage modules may be used, in other embodiments.

The techniques described herein, therefore, provide for various mechanisms that allow for the UAV-based delivery of goods and/or data from one location to another. In some aspects, a landing perch for a UAV is disclosed that may retain, charge, and/or communicate with the UAV. In further aspects, landing and takeoff procedures are disclosed herein that may be used to ensure safe operation of the UAV during takeoff, flight, and landing of the UAV (e.g., using sensors on the landing perch). In yet another aspect, any number of landing perches may be combined to form a roost, thereby allowing a flock of delivery UAVs to be deployed from a centralized location (e.g., a distribution facility, a mobile roost, etc.). In yet another aspect, techniques are disclosed herein that ensure that a delivery UAV maintains compliance with any regulatory agencies, such as an ATC service. In yet a further aspect, techniques are described herein that allow a UAV to transport a large data set to or from a location that has an Internet connection with limited capabilities.

While there have been shown and described illustrative embodiments that provide for the operation of a delivery UAV, it is to be understood that various other adaptations and modifications may be made within the spirit and scope of the embodiments herein. For example, the embodiments have been shown and described herein primarily with respect to certain computing elements. However, the embodiments in their broader sense are not as limited, and may, in fact, be distributed across multiple computing devices. For example, it is to be appreciated that a controller of a UAV landing perch may be located remotely therefrom and implemented using one or more computing devices/servers. Further, while certain communication protocols are disclosed herein, any other form of wireless or wired communication may be used, without deviating from the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A landing perch for an unmanned aerial vehicle (UAV), comprising:
    a base having a plurality of posts that extend from the base and are configured to couple with apertures of the UAV to retain the UAV in a docked position on the base after landing, wherein one or more of the posts comprise an electrical contact configured to provide an electrical charge to the UAV when the UAV is docked on the landing perch;
    one or more electromagnets located on one or more of the plurality of posts; and
    a controller that includes:
        one or more network interfaces to communicate with a computer network;
        a processor coupled to the one or more network interfaces and configured to execute a process; and
        a memory configured to store the process executable by the processor, the process when executed operable to:
            detect the UAV within proximity of the landing perch;
            cause the UAV to align the apertures of the UAV with one or more of the plurality of posts of the base; and
            activate the one or more electromagnets on the posts to retain the UAV on the landing perch.

2. The landing perch of claim 1, wherein the process when executed is further operable to:
    determine that the UAV is within a predefined distance, attitude, or orientation relative to the landing perch during approach to the base.

3. The landing perch of claim 1, wherein the process when executed is further operable to:
    determine that the UAV is within an arrival time at the landing perch during approach to the base.

4. The landing perch of claim 1, wherein the landing perch further comprises one or more proximity sensors, and wherein the process when executed is further operable to:
    detect the presence of the UAV near the landing perch by the one or more of the proximity sensors.

5. The landing perch of claim 4, wherein the sensor is a lens or a security camera.

6. The landing perch of claim 1, wherein one or more of the plurality of posts comprises a force sensor configured to measure a force exerted on the one or more posts when the UAV is docked onto the perch.

7. The landing perch of claim 1, wherein the process when executed is further operable to:
    cause the one or more electromagnets to interact with one or more magnets of the UAV.

8. The landing perch of claim 1, wherein the process when executed is further operable to:
    activate the one or more electromagnets to repel the UAV away from the perch.

9. The landing perch of claim 1, wherein the base further comprises an aperture through which the UAV deposits or receives a package for delivery.

10. The landing perch of claim 1, wherein one or more of the posts comprise an aperture through which a cooling or heating medium is provided to the UAV when the UAV is docked on the landing perch.

11. The landing perch of claim 1, further comprising:
    an optical or radio transceiver via which the controller communicates with the UAV.

12. The landing perch of claim 1, wherein in the process when executed is operable to:
    instruct the UAV docked on the landing perch to perform a pre-flight test operation of a pre-flight test routine prior to being launched from the landing perch;
    receive sensor data associated with the pre-flight test operation from the one or more force sensors of the landing perch, in response to the UAV performing the pre-flight test operation;
    determine whether the sensor data associated with the pre-flight test operation is within an acceptable range; and
    cause the UAV to launch from the landing perch based in part on a determination that UAV has passed the pre-flight test routine.

13. A method comprising
    detecting, by a controller, that an unmanned aerial vehicle (UAV) is within proximity of a landing perch, the landing perch comprising:
        a base having a plurality of posts that extend from the base and are configured to couple with apertures of the UAV to retain the UAV in a docked position on the base after landing, wherein one or more of the posts comprise an electrical contact configured to provide an electrical charge to the UAV when the UAV is docked on the landing perch, and one or more electromagnets located on one or more of the plurality of posts;

causing, by the controller, the UAV to align the apertures of the UAV with one or more of the plurality of posts of the base; and activating, by the controller, the one or more electromagnets on the posts to retain the UAV on the landing perch.

14. The method of claim 13, further comprising:

instructing, by the controller, the UAV docked on the landing perch to perform a pre-flight test operation of a pre-flight test routine prior to being launched from the landing perch;

receiving, at the controller, sensor data associated with the pre-flight test operation from the one or more force sensors of the landing perch, in response to the UAV performing the pre-flight test operation;

receiving, at the controller, data indicative of an acceptable range for the sensor data associated with the pre-flight test operation;

determining, by the controller, whether the sensor data associated with the pre-flight test operation is within the acceptable range; and causing, by the controller, the UAV to launch from the landing perch based in part on a determination that UAV has passed the pre-flight test routine.

15. A system comprising:

a roost having a communication system configured to execute processes to manage communication to the UAVs and a plurality of landing perches for a plurality of unmanned aerial vehicles (UAVs), each landing perch including: a base having a plurality of posts that extend from the base and are configured to couple with apertures of a particular UAV to retain the particular UAV in a docked position on the base after landing, and one or more electromagnets located on one or more of the plurality of posts; and a controller that includes:

one or more network interfaces to communicate with a computer network;

a processor coupled to the one or more network interfaces and configured to execute a process; and a memory configured to store the process executable by the processor, the process when executed operable to:

detect that a UAV is in proximity of the particular perch;

align the UAV with one or more of the plurality of posts of a selected perch; and activate the one or more electromagnets on the posts of the selected perch to retain the UAV on the landing perch.

16. The system of claim 15, wherein the roost is positioned on a road vehicle or a seagoing vessel.

17. The system of claim 15, wherein the roost is positioned on a stationary structure.

18. The system of claim 15, wherein the roost further comprises a loading mechanism to load a parcel onto the selected UAV when in a docked position on the selected perch.

* * * * *